US008934468B2

(12) United States Patent
Maekawa

(10) Patent No.: US 8,934,468 B2
(45) Date of Patent: Jan. 13, 2015

(54) COMMUNICATION TERMINAL, METHOD AND SYSTEM FOR TRANSMITTING DATA

(75) Inventor: Itaru Maekawa, Karuizawa (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1470 days.

(21) Appl. No.: 11/106,360

(22) Filed: Apr. 14, 2005

(65) Prior Publication Data

US 2005/0233789 A1 Oct. 20, 2005

(30) Foreign Application Priority Data

Apr. 16, 2004 (JP) .................................. 2004-121122
Apr. 11, 2005 (JP) .................................. 2005-113820

(51) Int. Cl.
*H04L 12/413* (2006.01)
*H04L 12/12* (2006.01)
*H04L 12/875* (2013.01)
*H04L 12/861* (2013.01)
*H04W 52/02* (2009.01)

(52) U.S. Cl.
CPC ................ *H04L 12/12* (2013.01); *H04L 47/56* (2013.01); *H04L 49/90* (2013.01); *H04L 49/9031* (2013.01); *H04W 52/0229* (2013.01); *Y02B 60/50* (2013.01)
USPC ........... 370/345; 370/337; 370/338; 370/329; 370/395.4; 370/447; 370/462

(58) Field of Classification Search
None
See application file for complete search history.

(56) References Cited

U.S. PATENT DOCUMENTS

| 7,184,413 | B2 * | 2/2007 | Beyer et al. ................... 370/254 |
| 7,313,420 | B2 | 12/2007 | Suda et al. |
| 7,428,240 | B2 * | 9/2008 | Jang et al. ..................... 370/447 |
| 7,668,126 | B2 * | 2/2010 | Ho ................................ 370/310 |
| 2003/0203741 | A1 | 10/2003 | Matsuo et al. |
| 2004/0013135 | A1 | 1/2004 | Haddad |
| 2004/0102159 | A1 | 5/2004 | Suda et al. |

FOREIGN PATENT DOCUMENTS

| CN | 1310413 | | 8/2001 |
| EP | 0971541 | | 1/2000 |
| EP | 1296484 | | 3/2003 |
| EP | 1473876 | A1 * | 11/2004 |
| GB | 2392062 | | 2/2004 |
| JP | 2004-74813 | | 3/2004 |
| JP | 2004-104265 | | 4/2004 |

(Continued)

OTHER PUBLICATIONS

European Search Report and Annex to the European Search Report dated Feb. 11, 2008, for corresponding European Application No. 05 00 8265.

(Continued)

*Primary Examiner* — Willie J Daniel, Jr.
(74) *Attorney, Agent, or Firm* — Katten Muchin Rosenman LLP

(57) ABSTRACT

Each station makes a transition to a power saving state autonomously in response to the reception of signals from the other stations in the same group and the transmission of its own signal. Each station sets its transmission timing such that it does not overlap the transmission timing of the other stations, by referring to data elements included in a beacon signal. The transmission timing in the stations is determined for each transmission.

8 Claims, 14 Drawing Sheets

(56) References Cited

FOREIGN PATENT DOCUMENTS

| WO | 9913624 | 3/1999 |
|---|---|---|
| WO | 0048367 | 8/2000 |
| WO | 2004/030780 | 4/2004 |

OTHER PUBLICATIONS

Stefan Mangold, et al. "Analysis of IEEE 802.11e and Application of Game Models for Support of Quality-of-Service in Coexisting Wireless Networks", Jun. 30, 2003, p. 1., 41-60, XP002466976, Retrieved from the Internet.

Stefan Mangold, et al. "Analysis of IEEE 802.11E for QoS Support in Wireless Lans" IEEE Wireless Communications, Dec. 6, 2003, vol. 10, No. 6, pp. 40-50, ISSN: 1536-1284, IEEE Service Center, Piscataway, NJ, US.

Eun-Sun Jung, et al. "An Energy Efficient MAC Protocol for Wireless LANs" Proceedings IEEE INFOCOM, vol. 1 of 3, Conf. 21, Jun. 23, 2002, pp. 1756-1764.

Jong-Mu Choi, et al. "Enhanced Power Saving Scheme for IEEE 802.11 DCF Based Wireless Networks" Lecture Notes in Computer Science, vol. 2775, No. 2003, Sep. 16, 2003, pp. 835-840.

"Part 11: Wireless LAN Medium Access Control (MAC) and Physical Layer (PHY) Specifications" ANSI/IEEE STD 802.11, Jun. 12, 2003, pp. I-XIV, 1-137, 392-395, 461-464, 486-487.

Chinese First Office Action dated Jan. 26, 2011, from the corresponding Chinese Application.

Notification of Reason(s) for Refusal dated Aug. 10, 2010, from the corresponding Japanese Application.

Tokuya Kudoh. "Pocket PC 'e740W' now available for corporate users" Mobile Press, 2002 Autumn, vol. 2, No. 4, pp. 84-87, Gijyutsu Hyoronsha, Nov. 24, 2002.

Korean Notice of Preliminary Rejection dated Dec. 21, 2011, from corresponding Korean Application No. 10-2011-0095307.

Chinese Third Office Action dated Jan. 5, 2012, from corresponding Chinese Application No. 201010151605.2.

European Communication pursuant to Article 94(3) EPC dated Jun. 24, 2011, from corresponding European Application No. 05 008 265.0.

Korean Notice of Preliminary Rejection dated Jun. 22, 2011, from corresponding Korean Application No. 10-2005-0031680.

Chinese Second Office Action dated Sep. 7, 2011, from corresponding Chinese Application No. 201010151605.2.

Korean Notice of Preliminary Rejection dated Mar. 27, 2012, from corresponding Korean Application No. 10-2005-0031680.

Chinese Rejection Decision dated Apr. 8, 2013, from corresponding Chinese Application No. 201010151605.2.

Chinese Fourth Office Action dated Aug. 3, 2012, from corresponding Chinese Application No. 201010151605.2.

\* cited by examiner

COMMUNICATION TERMINAL, METHOD AND SYSTEM FOR TRANSMITTING DATA

BACKGROUND OF THE INVENTION

1. Field of the Invention

The present invention relates to a technology for conducting communication between a plurality of communication terminals.

2. Description of the Related Art

With the realization of miniaturization and lightweight of information terminals, it has become common nowadays for people to carry an information terminal. In association with this, study has been vigorously undertaken on the construction of wireless ad hoc network for on-demand communication. In an ad hoc network, base stations and access points are not necessary. It is therefore easy to build a network even in places where no such infrastructure exists. By using an ad hoc network, a plurality of users may enjoy a game together as they join each other, bringing their own portable game devices and communicating wirelessly.

An ad hoc network is built by allowing terminals to communicate with each other using technologies such as IEEE802.11 or Bluetooth. No problem with power is presented when a terminal is capable of receiving power supply from an external power supply on a continuous basis. In the case of portable terminals, however, it is preferable that battery consumption be reduced as much as possible since such terminals are driven by limited battery power. To address this, a power control process in a power saving mode is standardized in communication standards such as IEEE802.11.

FIG. 1 is a timing chart illustrating the operation of stations in a power saving mode standardized in IEEE802.11. First, one of stations A-D sends a beacon signal. A beacon signal is a broadcast signal sent to all stations. A time window called Announcement Traffic Indication Message (ATIM) window is started subsequent to the beacon transmission. In this window, nodes are expected to maintain an active state. In the power saving mode according to the IEEE802.11 standard, each of the stations is allowed to send an ATIM signal during an ATIM window so as to prevent the other stations to go to sleep.

In the example of FIG. 1, station B sends an ATIM signal to station C in unicast communication, and station C returns an ACK signal to station B. Station A and station D do not send or receive an ATIM signal and therefore can go to sleep when the ATIM window expires. Station B and station C cannot go to sleep. When the ATIM window expires, station B sends data to station C. Station C returns an ACK signal to station B after receiving the data. Before a beacon interval as illustrated expires, station A and station D are activated to send or receive a beacon signal. In the subsequent ATIM window, none of the stations sends or receives an ATIM signal. Therefore, all stations go to sleep when the ATIM window is over.

The timing chart of FIG. 1 is an illustration of an extremely simple case intended to explain the power saving mode of the IEEE802.11 standard. In a case where a network comprised of a plurality of portable game devices is built, a larger number of signals are passed back and forth since the status information of the game-devices should be exchanged. For a game application with relatively severe requirement for real-time processing, the status information should be updated frequently. It is thus preferable to send data by multicast communication.

One problem with the power saving mode of the IEEE802.11 standard in multicast communication is that an ATIM window is set despite the fact that an ACK signal is not returned. The standard power saving mode prescribes that each station monitors an ATIM signal from the other stations during the ATIM window, in order to determine a station that can go to sleep. In other words, all stations are forced into an active state in this period even if they do not send status information. If we consider a case of a game application requiring low delay such as a racing game, it often happens that a player keeps an arrow key of a game controlling unit held down and operates cars in the racing game. In this situation, the status information should be sent to the other portable game devices on a continuous basis. During the ATIM window, however, the status information cannot be sent.

In a wireless environment accommodating a plurality of game devices, a problem with signal collision may occur. Improper signal reception could be addressed by retransmission control. For a game application requiring low delay, however, retransmission control may be subject to severe timing constraints.

SUMMARY OF THE INVENTION

Accordingly, an object of the present invention is to provide a technology that achieves power saving in communication between a plurality of terminals. Another object of the present invention is to provide a technology that achieves efficient transmission of signals between a plurality of terminals.

In order to resolve the aforementioned problems, the present invention according to one aspect provides a communication terminal which constitutes a group with at least one other communication terminal and communicates within the group, comprising: a receiver unit which receives a broadcast signal including data elements for determining a transmission timing; a transmission controller which determines the transmission timing for transmission of its own data signal, by referring to the data elements included in the broadcast signal; and a transmitter unit which transmits the data signal to the at least one other communication terminals according to the transmission timing determined by the transmission controller.

The present invention according to another aspect provides a communication terminal which constitutes a group with at least one other communication terminal and communicates within the group, comprising: a transmitter unit which transmits a broadcast signal periodically including data elements with different values for different broadcast signals, and a transmission controller which determines a transmission timing for transmission of its own data signal based on the data elements.

The present invention according to yet another aspect provides a communication system for communication between a plurality of communication terminals, wherein one of the communication terminals transmits a broadcast signal periodically including data elements with different values for different broadcast signals, and each of the communication terminals determines a transmission timing for transmission of its own data signal based on the data elements in the broadcast signal and transmits the signal to at least one of other communication terminals according to the determined transmission timing.

Arbitrary combinations of the aforementioned constituting elements, and implementations of the invention in the form of methods, apparatuses, systems, recording mediums and computer programs may also be practiced as additional modes of the present invention.

DETAILED DESCRIPTION OF THE INVENTION

Figure 1:
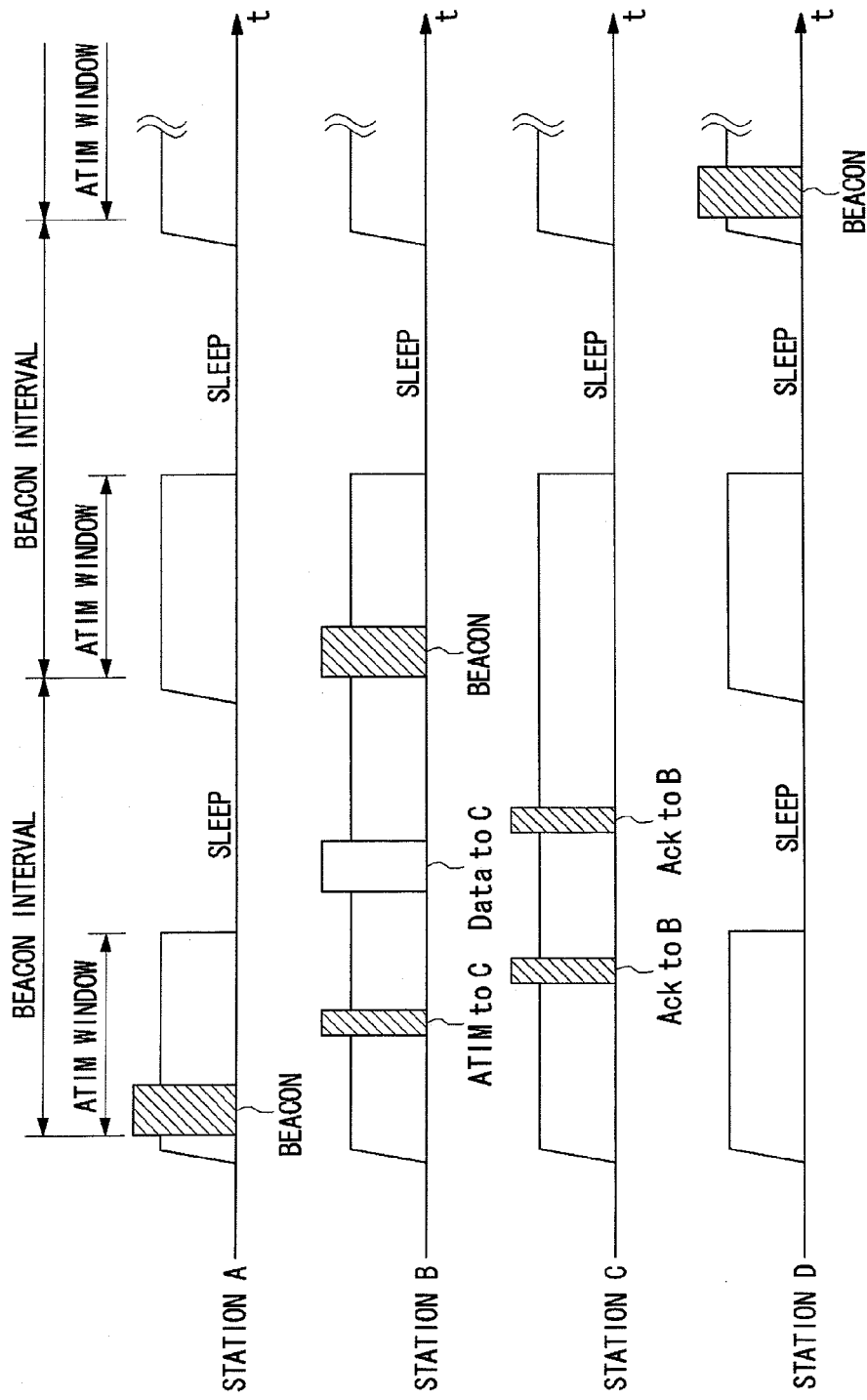
FIG. 1 is a timing chart illustrating the operation of stations in a power saving mode according to the IEEE802.11 standard.
Figure 2:
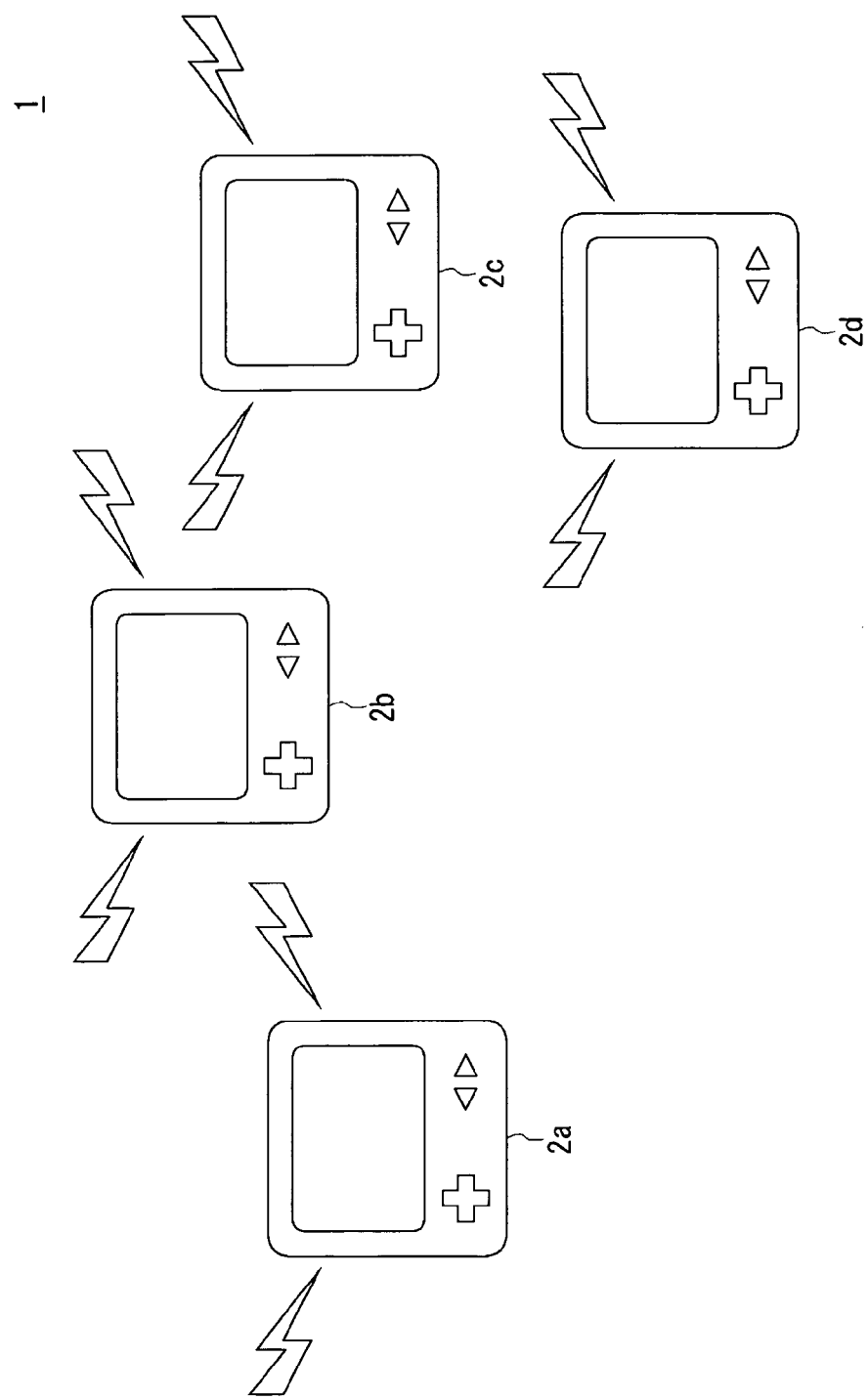
FIG. 2 illustrates a communication system according to a first example.

FIG. 2 illustrates a communication system 1 according to the example of the present invention. The communication system 1 is comprised of a plurality of communication terminals. In FIG. 2, four video game devices 2a, 2b, 2c and 2d, generically referred to as game devices 2, are illustrated as examples of the communication terminals. The number of game devices 2 is not limited to four. More than four devices may be provided. Each of the game devices 2 is provided with a wireless communication function. By bringing a plurality of game devices 2 together, a wireless network is built. For example, a wireless ad hoc network may be built by using a wireless LAN standard such as IEEE802.11b. The MAC layer technology of IEEE802.11 employs carrier Sense Multiple Access with Collision Avoidance (CSMA/CA) as an access control scheme. Each of the terminals is provided with the function of ensuring that a communication channel is idle for a predetermined duration of time before transmitting data. The wait time is a sum of a minimum time and a random time assigned to each terminal. This is to prevent collision of signals from a plurality of terminals transmitting simultaneously after an elapse of certain time since the previous communication. In unicast communication, a determination of proper or improper data transmission is made depending on whether an acknowledge (ACK) signal arrives from a receiving end. In the absence of an ACK signal, it is determined that a communication failure occurs so that the data is retransmitted.

The communication system 1 enables communication between a plurality of game devices 2 without requiring any additional infrastructure such as base stations and access points, by building an ad hoc network. By allowing the game devices 2 to receive status information of the other game devices, multiple players can enjoy the same game application at the same time.

Game applications are largely categorized into two groups in respect of requirement for real-time processing, i.e., into a group of games with relatively severe requirement for real-time processing and a group of games with less severe requirement for real-time processing. A game with severe requirement for real-time processing is characterized by a rapid game development and a need for immediate reflection of a user input in an output such as a game screen etc. Beat'-em-up games or racing games would be given as examples. A game with less severe requirement for real-time processing is characterized by a comparatively slow game development. Match-up games like Japanese chess and mah-jong as well as role playing games (RPG) would be given as examples.

Updating of a game screen takes place at a predetermined frame rate or a refresh rate. Currently, a field is usually rendered in about 16.7 msec (1/60 sec). Accordingly, for a game application with relatively severe requirement for real-time processing, i.e. a game application requiring low delay, it is preferable for a game device to let the other game devices know its status information and to know the status information of the other game devices at least once in every field (16.7 msec). Taking the example of racing game, the status information may be absolute information such as a position on a racing course, orientation of a vehicle and speed. The use of absolute information is assumed here because the reliability of communication in a wireless environment is not so high. If it is possible to ensure satisfactory reliability, information relative to a difference between past and present may serve the purpose. In the communication system 1, each of the game devices 2 is executing the application independently and asynchronously. For a game application not requiring low delay, retransmission is sufficient for the purpose even when data cannot be updated once in every field. Therefore, it is unlikely that the retransmission approach will severely affect the execution of the application.

A description will now be given of three types of communication schemes that can achieve the communication system 1 by allowing direct communication between the game devices. It will be assumed that the IEEE802.11 protocol is employed as a communication standard. An advantage of the IEEE802.11 protocol over other protocols like Bluetooth is its ease of Internet connection. By allowing the game devices 2 to employ IEEE802.11 as a communication protocol, it is not only possible to build a wireless network but also to enable connection to other terminals over the Internet. Accordingly, the expandability of the communication system 1 is improved.

(Type 1)

Figure 3A:
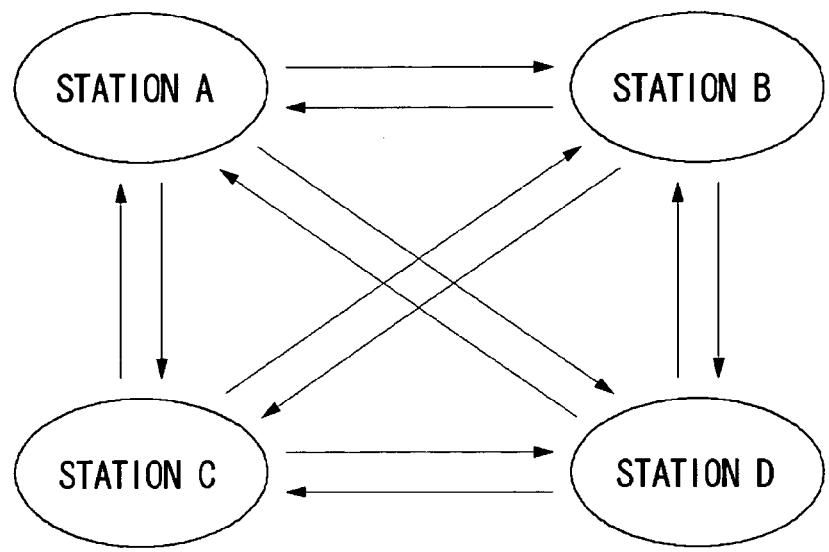
FIG. 3A illustrates how four stations are in unicast communication.

In type 1 communication, each of the stations is in unicast communication designating a single partner. FIG. 3A illustrates how four stations are in unicast communication. Each station corresponds to one of the game devices 2 in the communication system 1. According to the IEEE802.11 protocol, each station sends status information to the other three stations. Therefore, in unicast communication, a total of twelve sessions for communication of status information take place. Counting the ACK signals returned in response, a total of twenty-four communication sessions take place. In an application requiring low delay, it is necessary for these twenty-four communication sessions to occur in a field. Under CSMA/CA rules, it is assumed that control is effected so that no collision of packets occur. Actually, it is not easy to allow twenty-four communication sessions to occur in a period of 16.7 msec while avoiding collision of packets. As the number of stations increases, the number of communication sessions required in a field also increases. For the reasons stated above, the communication system of a type as illustrated in FIG. 3A will prove useful in a game application not requiring low delay.

(Type 2)

Figure 3B:
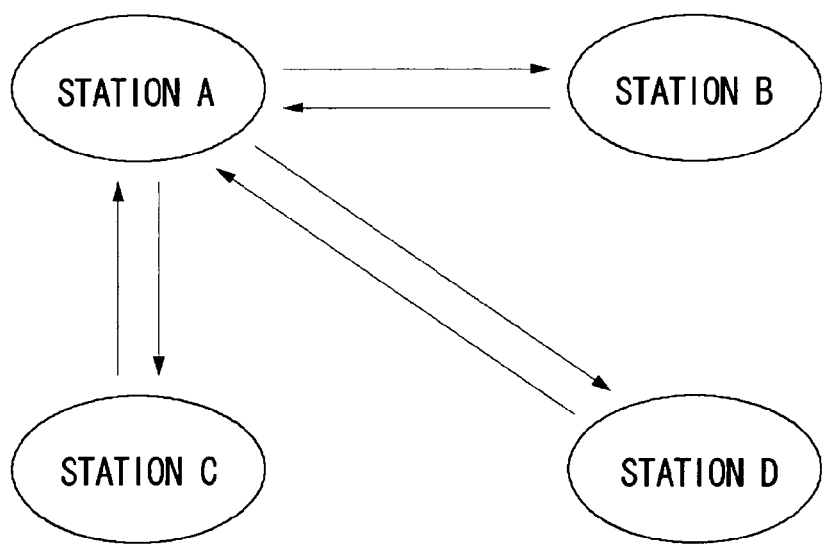
FIG. 3B illustrates a situation in which one station serves as an access point and the other three stations are in unicast communication with the access point.

In type 2 communication, one of the stations serves as an access point and the stations are in unicast communication with each other. FIG. 3B illustrates a situation in which station A serves as an access point and the other three stations are in unicast communication with station A. Station A receives status information from the other three stations B, C and D. Station A compiles the status information of station A and that of stations C and D in a packet and sends the compiled packet to station B. Similarly, station A sends to station C the status information of the three stations other than station C. To station D, station A sends the status information of the three stations other than station D. Thus, in unicast communication of this type, a total of six sessions for communication of status information take place. Considering the ACK signals returned in response, a total of twelve communication sessions take place. As compared to the communication system of type 1 illustrated in FIG. 3A, the load imposed on a host CPU of station A serving as an access point will definitely be increased. Meanwhile, since the number of communication sessions is reduced, type 2 will prove more useful than type 1 for data communication requiring higher speed.

(Type 3)

In type 3 communication, each station is in multicast communication. In an ad hoc network of IEEE802.11, a random value called Basic Service Set ID (BSSID) is assigned to each network for discrimination from other networks. Accordingly, each station can send its data frame in multicast to stations constituting a group in the same basic service area, by including a BSSID in the data frame. When a communication protocol other than IEEE802.11 is used, each station may perform multicast communication by designating the addresses of the other three stations.

Figure 4:
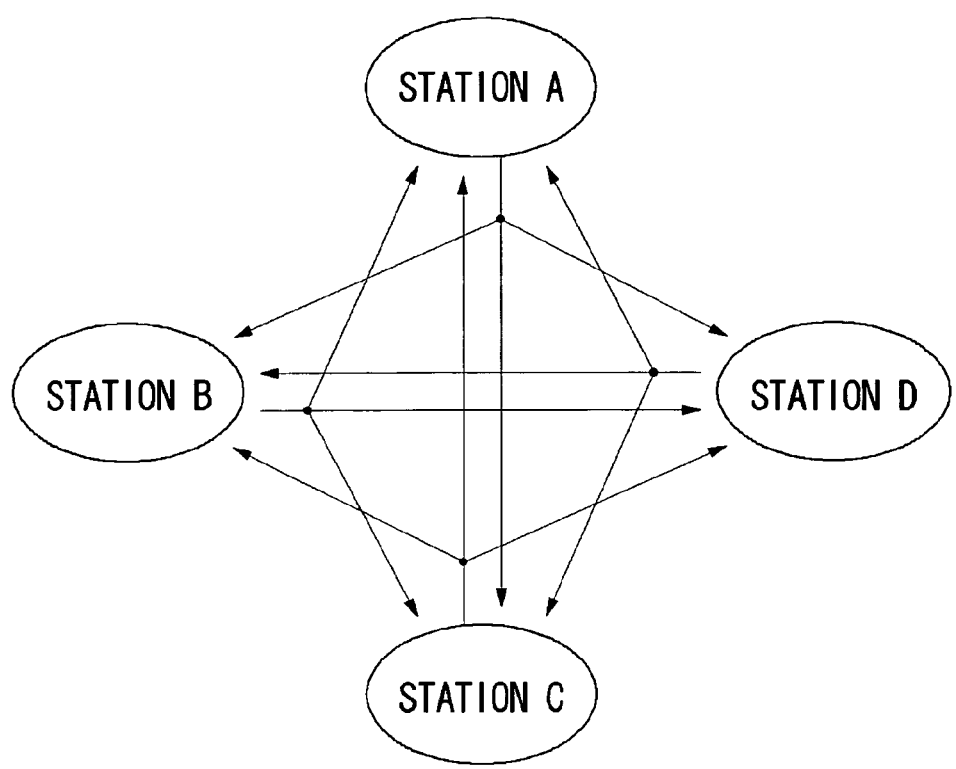
FIG. 4 illustrates how the stations are in multicast communication.

FIG. 4 illustrates how the stations are in multicast communication, sending the same data to multiple stations. More specifically, station A sends its status information in one packet by including a BSSID in a data frame. Stations B, C and D operate in a similar manner. Accordingly, a total of four sessions for communication of status information take place in this multicast communication. An ACK signal is not returned in multicast communication. Accordingly, the number of communication sessions is significantly reduced as compared to the communication systems of type 1 and type 2 illustrated in FIG. 3A and FIG. 3B, respectively. Type 3 communication is therefore most suitable for data communication requiring high speed and applies less load on the stations. Accordingly, the communication system of type 3 illustrated in FIG. 4 will prove most useful for a game application requiring low delay.

Thus, three types of communication system are conceivable to achieve the communication system 1 of the examples. Whichever type is selected, it is preferable that power consumption in the game devices 2 (stations) be minimized. In a similar way to cell phones, provisions for time-based intermittent operation in terminals participating in a wireless ad hoc network will help save power significantly. In the following description, the phrase "sleep state" applies to a state in which only a part of an air interface is operating or made operable with a significantly reduced power consumption due to cut-off of a current to a bias circuit in a transceiver unit (mainly comprised of an analog circuit) of the air interface, or due to the suspension of clock supply to a modem unit/MAC unit. The phrase "active state" applies to a state in which the entirety of functions of the air interface is operating or made operable.

First Example

In the first example, power saving is achieved by extending the duration of sleep state. Generally, saving of power is easier to achieve in applications not requiring low delay, since a relatively long sleep state can be set. In the following description, a game application requiring severe latency and demanding high speed is assumed. The description concerns a communication method capable of achieving power saving in an environment under such an assumption.

Figure 5:
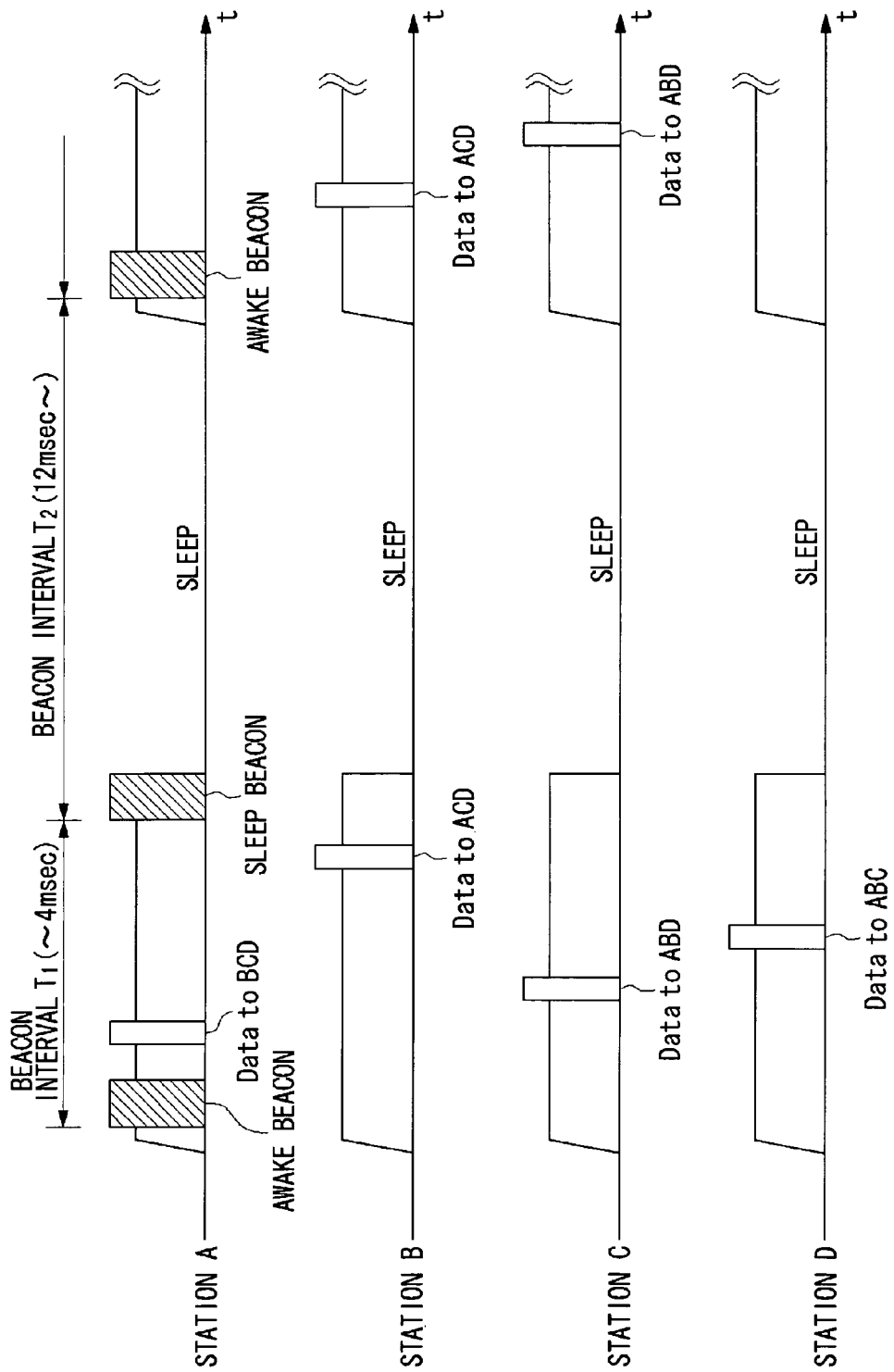
FIG. 5 is a timing chart illustrating the operation of stations in a power saving mode according to the first example.

FIG. 5 is a timing chart illustrating the operation of stations in a power saving mode according to the first example. A beacon signal illustrated in the timing chart is a broadcast signal communicated to all stations. A beacon frame includes essential fields such as a time stamp, a beacon interval, capability information, a service set ID and a supported rate. Also included are optional fields such as an FH parameter set, a DS parameter set, a CF parameter set, an IBBSS parameter set and a TIM. Optional information is provided only when necessary. Each station stands by for a random wait time called backoff since a Target Beacon Transmission Time (TBTT) defining the end of the last beacon interval before transmitting a beacon signal. When the station receives a beacon signal before its transmission time arrives, the transmission of a beacon signal on hold is cancelled. Accordingly, only one station sends a beacon signal in the communication system 1. Since a beacon frame should be processed by all stations, all stations are forced into an active state before a TBTT.

In the example illustrated in FIG. 5, the originator of a beacon signal is fixed. Station A is responsible for the transmission of a beacon signal. With this approach, a situation is avoided where a plurality of stations transmit a beacon signal simultaneously, creating collision of beacon signals. The communication illustrated in FIG. 5 attaches importance to high speed of data communication and employs the multicast communication of type 3. With this, the stations need not monitor ACK signals returned. Moreover, the status information can be sent to a plurality of stations in one packet.

Referring to the timing chart, station A sends an awake beacon signal for awaking the stations. The awake beacon signal declares that all stations should be in an awake state (active state). The declaration is made using an empty field in a beacon frame. For example, an optional field such as an FH parameter set or TIM is used. At this point of time, all stations are activated. Upon receipt of the awake beacon signal, stations B, C and D acknowledge that time has arrived for these stations to send their status information. Subsequent to the transmission or reception of the awake beacon signal, each of stations A, B, C and D determines a transmission time for transmitting its status information by generating a random backoff interval, while maintaining their active state. Subsequently, each of stations sends its status information to the other stations in multicast at the determined transmission time. The timing chart of FIG. 5 illustrates how the stations send data in multicast according to a random timing adjustment. The communication system 1 is also subject to collision avoidance control according to CSMA/CA. Therefore, when a station finds that another station is transmitting data at its transmission time, it waits the random backoff interval after the end of the transmission by another station and then sends its status information. Data transmission from all of the stations is completed before the next sleep beacon signal is transmitted, i.e., in a beacon interval $T_1$.

Station A then sends a "sleep" beacon signal. A sleep beacon signal declares that all stations should make a transition to a sleep state. In a similar way to the awake beacon signal, the declaration of sleep is made using an empty field in a beacon frame. For example, an optional field like an FH parameter set or TIM is used. At this point of time, all stations are activated. Upon receipt of a sleep beacon signal, stations B, C and D acknowledge that they should go to a sleep state and then enters a power saving state (sleep state) by controlling a bias circuit and a clock circuit. Station A enters a sleep state after transmitting the sleep beacon signal.

The stations in a sleep state are activated for transmission or reception of the next beacon signal after an elapse of a predetermined period of time, i.e., a beacon interval $T2$, since the transmission or reception of the sleep beacon. Transition from a sleep state to an active state is an autonomous process in a terminal using a timer or the like inside an air interface terminal. Device-dependent requirements, such as time required to stabilize an internal analog circuit, determine the timing of activation. For advanced power saving, the later in time the activation of the stations, the better. When station A transmits an awake beacon signal in this state, all stations maintain an active state, determine their transmission time and transmit at the determined transmission time.

Referring to the timing chart of FIG. 5, it will be found that two kinds of beacon signals are employed in the first example to enforce an activation period and a sleep period in the stations. More specifically, a predetermined period of time is divided into two time slots. Each station transmits and receives data in one of the time slots and is controlled to be in a sleep state in the other. With this, a period in which a station remains active needlessly is minimized. By allowing the stations to go to sleep the rest of the time, highly efficient power saving is achieved.

Considering that a period of 16.7 msec is required to render a field, it is preferable to set the cycle of transmission of an awake beacon, i.e., $T_1+T_2$, to be 16.7 msec or shorter, and, more preferably, as short as 16 msec. By configuring the cycle of awaking the stations to be shorter than 16.7 msec, it is ensured that the status information is transmitted and received at least once in every field. With this, it is possible to achieve smooth game development in a game application requiring low delay, while properly meeting the requirement for a sleep period.

Once the period $(T_1+T_2)$ is set, the beacon interval $T_1$ may be configured in consideration of the number of game devices 2 participating in the network. If the number of game devices 2 is large, the beacon interval $T_1$ may be long. If it is small, the beacon interval $T_1$ may be short. Admittedly, the time consumed by each station for transmission depends on game applications but a general estimate would be about several hundred μsec, and so the beacon interval $T_1$ of about 4 msec is considered to be sufficient. When the beacon interval $T_1$ is set to 4 msec and the beacon interval $T2$ is set to 12 msec, a sleep period occupying 75% of the overall time is set in the stations. Alternatively, the beacon interval $T_1$ may be determined in consideration of the modulation mode of data or the size of game data. By increasing a ratio $T2/(T_1+T_2)$, the efficiency of power saving is enhanced. Therefore, it is desirable that the beacon interval $T_1$ be minimized.

Station A, responsible for the transmission of a beacon signal, may be assigned the task of determining the beacon interval $T_1$ on the basis of the aforementioned considerations. The beacon interval $T_1$ may be dynamically modified so that the beacon interval $T2$ may be dynamically modified accordingly. Preferably, station A modifies the beacon interval $T_1$ adaptively in response to factors such as an increase or decrease in the number of game devices 2, or extraneous factors such as a change in the communication environment. When the cycle $(T_1+T_2)$ is set to a predetermined time, the value of T2 varies with $T_1$. If a condition $(T_1+T_2) \leq$ predetermined time is prescribed, the value of T2 varies with $T_1$ within the constraints of this condition. Accordingly, power control suitable for respective situations is executed. The value of beacon interval set by station A is built in a beacon frame. With this, stations B, C and D are capable of knowing the timing of transmission of the next beacon so that they can make a transition from a sleep state to an active state at the designated time.

The description given above assumes the updating of status information at least once in every field (16.7 msec) in anticipation of requirement for low delay. If latency requirement is less severe, the duration of beacon interval T2 relative to the beacon interval $T_1$ may be extended. In this case, the sleep period is extended so that even highly efficient power saving is achieved. For example, a game application may request the updating of status information at least once in every two fields (33.3 msec) or at least once in every three fields (50 msec).

Figure 6:
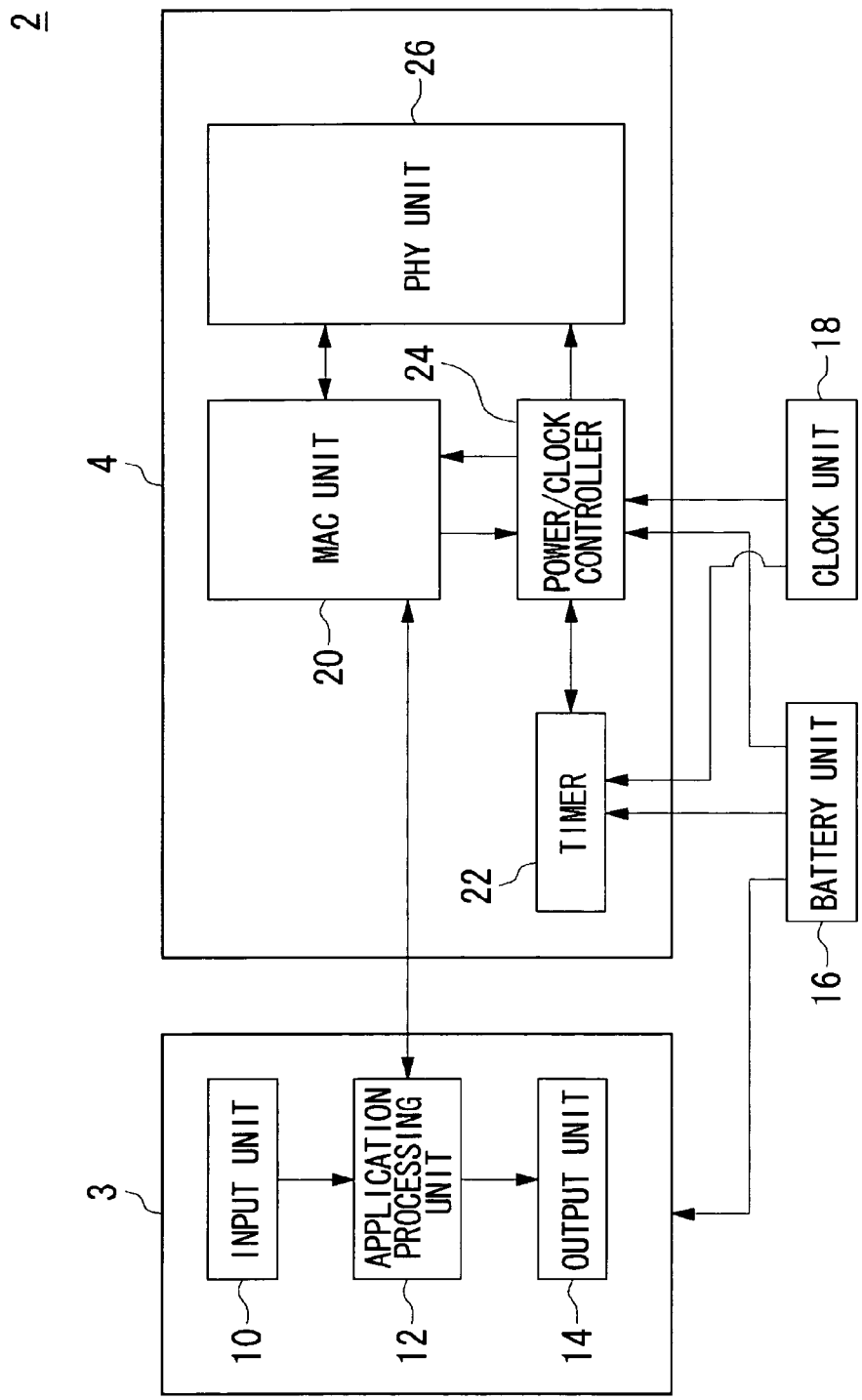
FIG. 6 is a block diagram of a game device.

FIG. 6 is a block diagram of each of the game device 2. The game device 2 is provided with a game processor 3 for executing operations related to game processes, and a communication processor 4 for executing operations related to communication. The game device 2 is further provided with a battery 16 for supplying power and a clock unit 18 for generating pulses at predetermined time intervals. The game processor 3 is provided with an input unit 10, an application processing unit 12 and an output unit 14. The communication processor 4 is provided with a MAC unit 20, a timer unit 22, a power/clock controller 24 and a PHY unit 26.

Functions for communication in the first example are implemented in the communication processor 4 by a CPU, a memory and a program loaded into the memory. FIG. 6 depicts function blocks implemented by the cooperation of the elements. The program may be built in the game device 2 or supplied from an external source in the form of a recording medium. Therefore, it will be obvious to those skilled in the art that the function blocks may be implemented by a variety of manners including hardware only, software only or a combination of both.

The input unit 10 comprises a group of buttons including an arrow key that accept commands from a user for operation. The application processing unit 12 runs the game application by referring to the command input via the input unit 10 and the status information from other game devices 2 received via the PHY unit 26. The output unit 14 comprises a display and a speaker for output of the result of process in the application processing unit 12. The local status information processed in the application processing unit 12 is stored in a buffer in the MAC unit 20. The clock unit 18 supplies a clock to the timer 22 and the power/clock controller 24. The timer may be an independent element as illustrated. Alternatively, the timer 22 may be a function built in the MAC unit 20 or in the power/clock controller 24.

The battery 16 supplies power to the game processor 3, the timer 22 and the power/clock controller 24. The power/clock controller 24 controls the supply of power and clock to the MAC unit 20 and the PHY unit 26. More specifically, the power/clock controller 24 causes the MAC unit 20 and the PHY unit 26 to make a transition from an active state to a sleep state or from a sleep state to an active state. The MAC unit 20 is provided with the function of generating a beacon signal and analyzing a beacon signal received from other game devices 2 via the PHY unit 26.

When the game device 2 is responsible for the transmission of a beacon signal, the MAC unit 20 inserts the value of beacon interval in an essential field in a beacon frame. In this process, the MAC unit 20 also enters information (flag) indicating whether an awake beacon or a sleep beacon is intended in an empty area of an optional field of the frame. The PHY unit 26 transmits the beacon signal at a predetermined time. The timing of generation of a beacon signal by the MAC unit 20 and the timing of transmission of a beacon signal by the PHY unit 26 are controlled by the power/clock controller 24.

If the game device 2 is not responsible for the transmission of a beacon signal, the MAC unit 20 analyzes a beacon signal received so as to determine whether or not the game device 2 should enter a sleep state. More specifically, the MAC unit 20 determines whether the received beacon signal is for awake or for sleep by referring to the flag included in the option field. When it is determined that a sleep beacon signal is received, the MAC unit 20 issues a command to the power/clock controller 24 for transition to a sleep state. The power/clock controller 24 prevents power consumption in the MAC unit 20 and the PHY unit 26 by suspending the supply of a clock to the MAC unit 20 and the PHY unit 26 to suspend their operation. With this, the MAC unit 20 and the PHY unit 26 enter a sleep state. Concurrently, the power/clock controller 24 sets the timer 22 so that the MAC unit 20 and the PHY unit 26 return to an active state after an elapse of a predetermined period of time since their entry into the sleep state. The timer control is executed by referring to the beacon interval specified in the beacon frame. The value of beacon interval is sent from the MAC unit 20 to the power/clock controller 24. The period of time to elapse since the start of a sleep mode until activation is preferably set to be slightly shorter than the beacon interval T2. The timer 22 counts the pulses supplied from the clock unit 18 and supplies awake signal to the power/clock controller 24 after the predetermined period of time elapses. Upon receipt of the wake signal, the power/clock controller 24 causes the MAC unit 20 and the PHY unit 26 to make a transition to an active state.

When the received signal is an awake beacon signal, the MAC unit 20 and the PHY unit 26 are already activated. In other words, the MAC unit 20 and the PHY unit 26 are activated under the above-described timer control to receive an awake beacon signal. The game device 2 maintains its active state until it receives the next sleep beacon signal.

When the PHY unit 26 receives an awake beacon signal, the MAC unit 20 determines a transmission time for transmission of status information as a random number. When the transmission time arrives, the PHY unit 26 reads the status information from the buffer and transmits the same. When another signal occurs at the transmission time, the MAC 20 shifts in time the transmission of status information so as to avoid collision.

In case the game device 2 is responsible for the transmission of a beacon signal, the MAC unit 20 under control of the timer 22 is informed of whether the device 2 should enter a power saving mode. With this information, the MAC unit 20 transmits a sleep beacon signal or an awake beacon signal. When transmitting a sleep beacon signal, the MAC unit 20 issues a command to the power/clock controller 24 for transition to a sleep state. The process performed by the power/clock controller 24 is as already described above. When transmitting an awake beacon signal, the MAC unit 20 and the PHY unit 26 are already activated at the time of transmission. In other words, the MAC unit 20 and the PHY unit 26 are activated under the timer control to transmit an awake beacon signal. The game device 2 responsible for the transmission of a beacon signal maintains its active state until it transmits the next sleep beacon signal. When an awake beacon signal has been transmitted, the MAC unit 20 determines a transmission time for transmission of status information as a random number. When the transmission time arrives, the MAC unit 20 reads the status information from the buffer and transmits the same.

Figure 7:
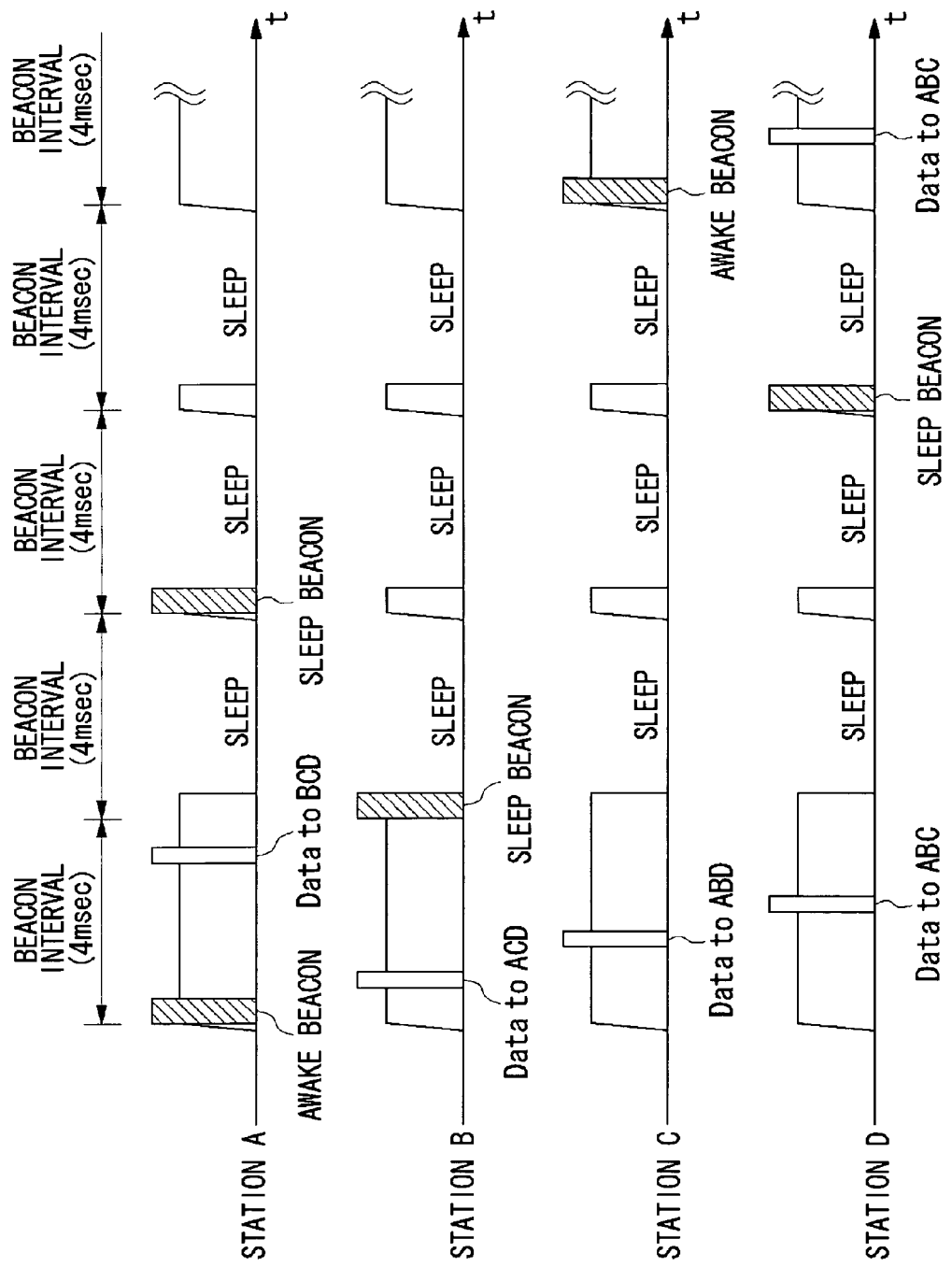
FIG. 7 is a timing chart illustrating the operation of stations in a power saving mode according to a variation of the first example.

FIG. 7 is a timing chart illustrating the operation of stations in a power saving mode according to a variation of the first example. It is assumed here that an arbitrary station is responsible for origination of a beacon signal, a broadcast signal. Each of stations A-D attempts the transmission of a beacon signal after standing by for a random backoff interval. When the fixed originator of a beacon leaves the network, selection should be made on the originator of a beacon signal. By not fixing the originator of a beacon, stations can freely participate in and leave the network in the communication system 1. In this variation, the beacon interval is fixed to, for example, 4 msec. The operation between an awake beacon signal and the immediately following sleep beacon signal is the same as the operation between the awake beacon signal and the sleep beacon signal illustrated in FIG. 5. Following an awake beacon signal, a sleep beacon signal is transmitted three times from one of stations A-D. Each station stands by for a random wait time since a target beacon transmission time TBTT defining the end of the previous beacon interval before transmitting a beacon signal. When the station receives a beacon signal before its own transmission time arrives, the transmission of a beacon signal on hold is cancelled. Each station enters a sleep state upon transmission or reception of a sleep beacon signal.

In the operation of stations illustrated in FIG. 7, the stations should be activated at intervals of 4 msec in order to transmit or receive a sleep beacon. In comparison with the station operation illustrated in FIG. 5, the operation according to the variation results in a slight drop in the efficiency of power saving. An advantage is that the setting of the beacon interval is simplified and easy to implement. Another advantage is uniform power consumption among the stations achieved by allowing all of the game devices 2 to generate a beacon signal. The beacon interval can be modified in accordance with the data volume of the game application or the number of games devices 2 participating in the network. The timing chart of FIG. 7 illustrates an arrangement in which the duration of 16 msec, which corresponds to the cycle of an awake beacon signal, is divided into four time slots, producing a beacon interval of 4 msec. As the number of participating stations increases, the duration may be divided into three. When it decreases, division may be into five equal intervals. With this adjustment, a beacon interval most suitable for power saving may be set.

A description will be given of a difference between the station operation of FIG. 5 and the operation according to the variation, with reference to the functional block diagram of FIG. 6. In the example of FIG. 7, the MAC unit 20 in all of the game devices 2 generates a beacon signal. Upon transmission or receipt of an awake beacon signal, the MAC unit 20 generates three sleep beacon signals at predetermined intervals and then generates an awake beacon signal. The other processes are the same as those already described with regard to the station operation of FIG. 5.

Figure 8:
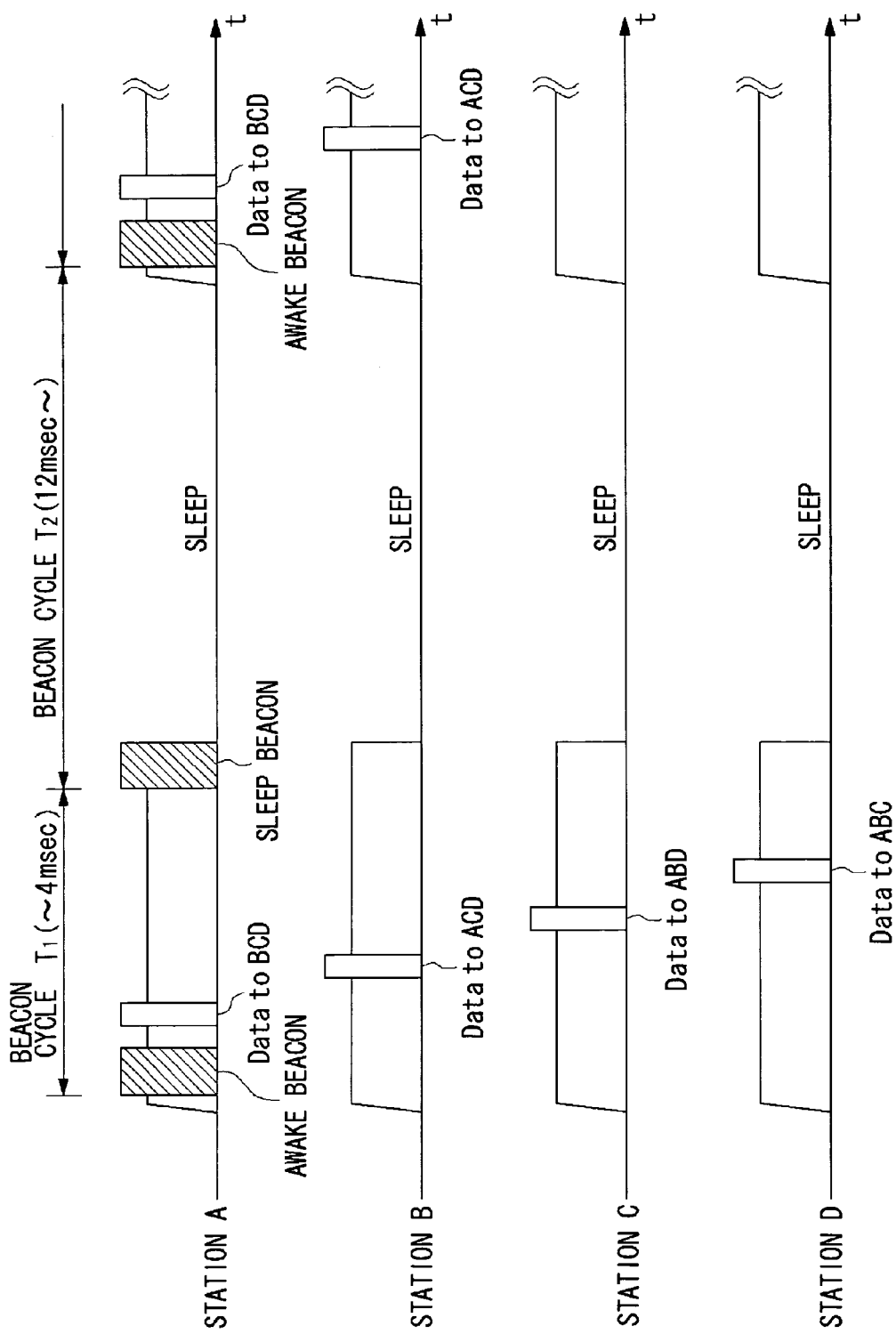
FIG. 8 is a timing chart illustrating the operation of stations in a power saving mode according to another variation of the first example.

FIG. 8 is a timing chart illustrating the operation of stations in a power saving mode according to another variation of the first example. Referring to FIG. 8, the originator of a beacon signal, a broadcast signal, is fixed to station A, and the beacon interval is variable. Alternatively, an arbitrary station could originate a beacon signal and the beacon interval may be fixed. The operation between a sleep beacon signal and an awake beacon signal is the same as the operation between the sleep beacon signal and the awake beacon signal illustrated in FIG. 5.

In the variation illustrated in FIG. 8, signals are transmitted according to the pseudo-time division multiple access (TDMA) scheme between an awake beacon signal and a sleep beacon signal. The transmission times of the stations are shifted in time with respect to the awake beacon signal by differently assigned offsets from station to station so that the transmission times of the stations do not overlap each other. For example, offsets may be shifted in time by 400 μsec from each other such that an offset 400 μsec is assigned to station A, 800 μsec to station B, 1200 μsec to station C and 1600 μsec to station D. The offsets may be fixedly assigned to the stations or dynamically assigned thereto. In case station A continues to transmit a beacon signal as illustrated, fixed assignment of the offsets to the stations would be easy. When an arbitrary station transmits a beacon signal, the station given the authority to transmit a beacon signal could assign the offsets dynamically. Assignment of the offsets is described by the station transmitting a beacon in an empty area in an optional field in a beacon frame, which is then transmitted to the other stations. Each of the stations receiving an awake beacon signal acknowledges its own offset and transmits its status information after an elapse of the designated offset. By performing pseudo-TDMA communication as described, collision of signals is properly avoided and communication with excellent quality is provided.

Second Example

In the example 2, each of a plurality of communication terminals constituting a group in a network achieves power saving autonomously, by receiving a signal from the other communication terminals constituting the group. For discrimination from the power saving mode described in the first example, the power saving mode according to the second example will be referred to as a self-controlled power saving mode.

In the second example, each of the communication terminals determines its transmission timing by referring to a broadcast signal transmitted from a coordinator in the network, in order to avoid collision of signals from the communication terminals. This function will be referred to as a collision avoidance mode. In the collision avoidance mode, the order of transmission from the communication terminals may be changed from transmission to transmission. In an ad hoc network, the coordinator is a communication terminal which is a group member. In an infrastructure network, the coordinator is an access point.

The MAC layer technology of IEEE802.11 employs CSMA/CA as an access control scheme, and so it is assumed that collision of signals is avoided by sensing a carrier. The possibility remains, however, that a plurality of communication terminals may transmit at the same time. In such a case, collision of signals occurs. Accordingly, the collision avoidance mode of the second example will suitably be used in IEEE802.11 and in other communication protocols. The self-controlled power saving mode and the collision avoidance mode of the second example can be performed by software for the most part and are easy to implement.

A network in which a plurality of communication terminals participate is assumed. Parameters described in the following are determined through negotiations in a lobby IBSS between applications or are preset in the stations. The negotiations may be done in an ad hoc mode or an infrastructure mode of IEEE802.11. When the participating stations are game devices 2, communication parameters may be preset in a game program stored in a disk inserted in the game devices 2. For negotiations in a lobby IBSS, a coordinator notifies the other group members of the communication parameters in unicast communication. The unicast communication can be executed in the standard ad hoc mode.

<Communication Parameters>
    a) Frequency channel
    b) SSID (Service Set Identity)
    c) TBTT (Target Beacon Transmission Time)
    d) Modulation/encoding scheme in the physical layer
    e) MAC addresses and station IDs of the stations (unit IDs)
    f) IFS (Inter Frame Space) generation mode (IEEE802.11 standard system or QoS based system using IFS vector)
    g) IFS vector value (valid only in QoS based system using IFS vector)
    h) Security mode/common key In the second example, it will be assumed that the QoS based system using an IFS vector is set as the IFS generation mode (f) The IFS vector value (g) is a time quantity in μsec used to determine the transmission time of a station. The IFS vector value includes IFS0 defining a reference time for transmission and IFS offset defining an offset from IFS0. The QoS based system using the IFS vector value is used in the collision avoidance mode for avoiding collision of signals and is not directly related to the self-controlled power saving mode in the second example. By executing the self-controlled power saving mode and the collision avoidance mode simultaneously, communication with improved efficiency is achieved.

The station notified of the communication parameters switches its air I/F to a game mode in accordance with the received parameters. The coordinator is assigned a station ID of 0. The other stations are assigned respective IDs preset in the communication parameters. In a network comprising four stations, station IDs of 1, 2 and 3 are assigned to three stations other than the coordinator. When the transition of all players to a game mode is complete, the coordinator switches its air I/F into a game mode. A game mode is defined as a mode in which a player runs a game. The self-controlled power saving mode and/or the collision avoidance mode according to the second example are executed in the game mode. In the game mode, the power saving mode according to the first example may be executed. Alternatively, the power saving mode of the first example and the self-controlled power saving mode of the second example may be selectively executed.

The parameter TBTT defines the timing of beacon transmission. The coordinator may configure an interval between TBTTs as appropriate in accordance with the type of game application. For example, for a game application requiring low delay, the interval between TBTTs may be configured to be short. For a game application not requiring low delay, the interval may be long. Considering that a period of 16.7 msec is required to render a field, it is preferable to set the cycle of beacon transmission to be 16.7 msec or shorter, and, more preferably, as short as 16 msec, for a game application requiring low delay. For a game application not requiring low delay, the beacon transmission cycle may be configured to be equal to or longer than 16.7 msec. The method of setting TBTT in the second example may be the same as the method of setting $(T_1+T_2)$ as described in the first example. According to the self-controlled power saving mode of the second example, the period of time started at TBTT in which a station remains active can be shortened. Therefore, the sleep period can be extended by extending the interval between TBTTs.

Figure 9:
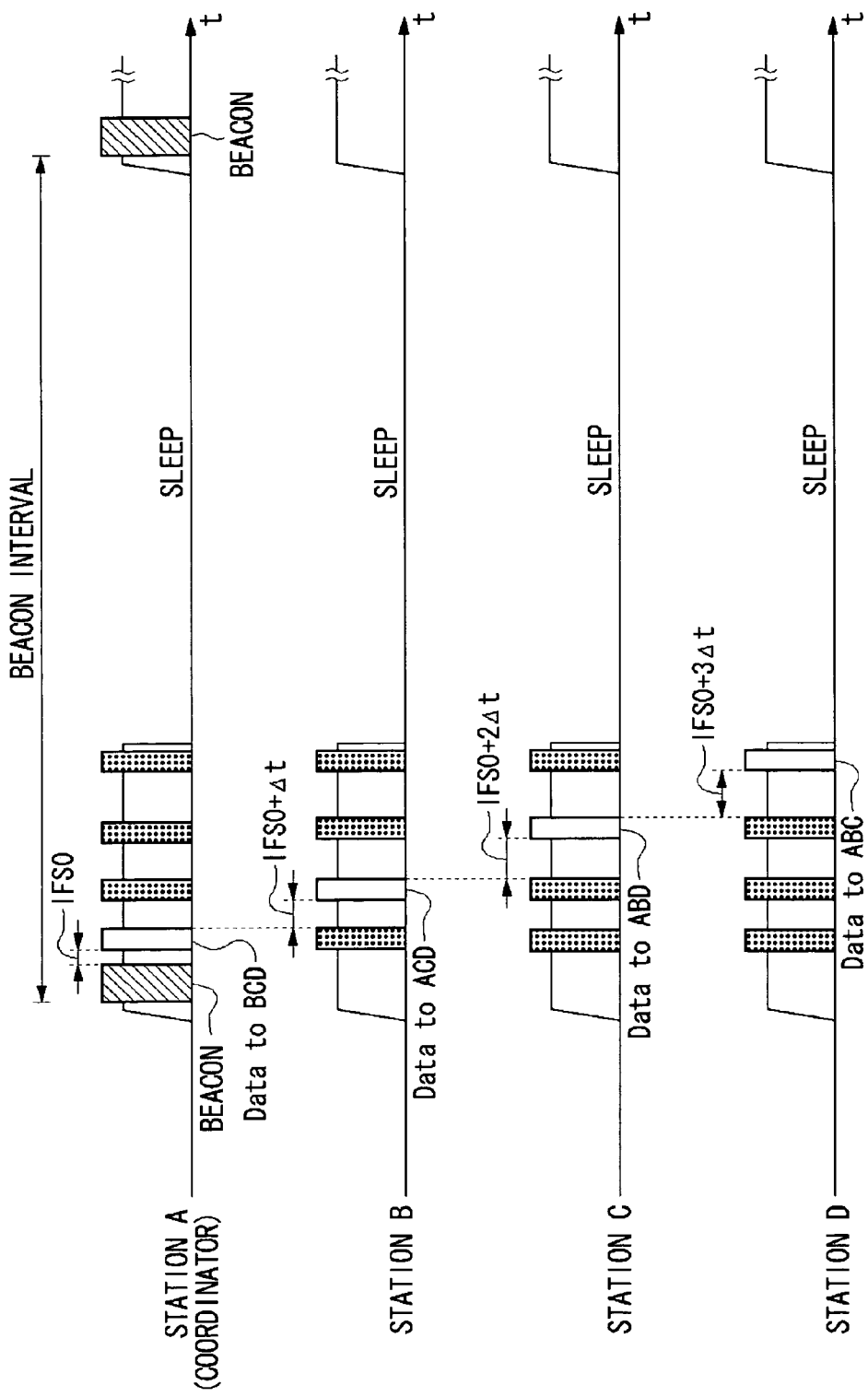
FIG. 9 is a timing chart illustrating the operation of stations for achieving a self-controlled power saving mode and a collision avoidance mode.

FIG. 9 is a timing chart illustrating the operation of stations for achieving the self-controlled power saving mode and the collision avoidance mode of the second example. Each station joins with at least one other station to constitute a group and is provided with the function of communicating in the group. A total of four communication terminals comprising stations A, B, C and D constitute a network of the example. The collision avoidance mode of the second example will first be explained.

Referring to the timing chart, a beacon signal is a broadcast signal transmitted to all stations. In the illustrated example, station A functions as a coordinator responsible for the transmission of a beacon signal. This will prevent simultaneous beacon transmission from a plurality of stations and collision of the beacon signals. It will also afford to station A the authority for overall control on communication in the network. The communication illustrated in FIG. 9 attaches importance to high speed of data communication and employs the multicast communication of type 3. With this, the stations need not monitor ACK signals returned. Moreover, status information can be sent to a plurality of stations in one packet.

Station A, the coordinator, is assigned the station ID of 0. In the description given below, it is assumed that the station ID of 1 is assigned to station B, 2 to station C, and 3 to station D.

Since a beacon frame should be processed by all stations, each of the stations is activated before its TBTT arrives. Each of the stations should leave a power saving state and enter an active state before transmitting or receiving a beacon signal. Also, each of the stations is enabled to transmit a data signal, prompted by the transmission or reception of a beacon signal. TBTT is communicated in advance by the coordinator to the stations and so the stations are capable of recognizing the timing to make a transition from a sleep state to an active state.

Referring to the timing chart, station A initially transmits a beacon signal. The beacon signal includes data elements that enable the stations to determine their data transmission timing. A beacon signal is transmitted periodically every time TBTTs arrive. Some values assigned to data elements included in the beacon signal may differ from signal to signal. In other words, some kinds of the data elements have different values for the different beacon signals.

In the second example, the beacon signal transmitted by station A includes a beacon ID, the number of IBSS stations and the IFS vector value. As described above, the IFS vector value includes IFS0 defining a reference time for transmission and IFS offset defining an offset from IFS0. The beacon ID is represented by, for example, four-bit data so that numerals 0 through 15 are cyclically assigned to the signals. The number of IBSS stations is equivalent to the number of stations constituting a group. In the example of FIG. 9, the number is set to 4. Of these data elements, the data element with a value that differs from signal to signal is the beacon ID. In other words, the beacon IDs have different values for different beacon signals. The number of IBSS players and the IFS vector value are maintained to be constant unless required otherwise. The IFS vector value included in a beacon signal is used when a third party participates in the IBSS or when another group creates a new IBSS in the same frequency band.

Each station determines its data signal transmission timing such that it does not overlap the data signal transmission timing of the other stations in the same network. Each station determines its order in the sequence of transmission in the group. The transmission timing is then determined by using the order of transmission thus determined and the IFS vector value. As described already, the IFS vector value is communicated by the coordinator in unicast communication and is preset as communication parameters. In other words, each station is informed of IFS0 and IFS offset before determining its order.

For example, the order of transmission may be determined in each station using the following equation.

(transmission order value)=(station ID+beacon ID)mod(number of stations)

A consideration will be given of the transmission order of station A (station ID=0).

Assuming that the beacon ID is 4, the transmission order value is determined as (0+4)mod 4=0

That the transmission order value is 0 means the earliest in the sequence of transmission.

In this case, the transmission order value of station B (station ID=1) is 1, the value of station C (station ID=2) is 2, and the value of station D (station ID=3) is 3. Thus, when the beacon ID is 4, transmission is ordered to occur in the sequence of station A, station B, station C and station D. The order of transmission may be determined according to another method as long as the transmissions by the stations do not overlap in the sequence.

Each station determines its transmission timing using the transmission order value indicating its order of transmission. The transmission timing is determined by the following equation.

(transmission timing)=IFS0+(transmission order value)×IFS offset

It will be assumed here that IFS0 is 15 μsec and IFS offset is 7 μsec. The transmission timing of station A is determined as 15+0×7=15 μsec In this case, the transmission timing of station B is 22 μsec, the transmission timing of station C is 29 μsec, and the transmission timing of station D is 36 μsec. The IFS offset is indicated as Δt in FIG. 9.

The MAC layer technology of IEEE802.11 employs carrier Sense Multiple Access with Collision Avoidance (CSMA/CA) as an access control scheme. Each of the stations is provided with the function of ensuring that a communication channel is idle for a predetermined duration of time before transmitting data. The transmission timing determined as described defines a time required to ensure that the communication channel is idle. That is, the transmission timing corresponds to an elapsed time since the detection of a signal from another terminal that the station has to wait before its transmission. When a duration defined by the transmission timing expires subsequent to the detection of a signal from another terminal, each station is allowed to transmit a data signal. The phrase "another terminal" may refer to another station or another electronic equipment unit in a different group as well as another station in the same group.

Preferably, the transmission timing, which defines a period for ensuring that the communication channel is idle, is set to be as short as possible. By setting the transmission timing to be short, the power saving function in the self-controlled power saving mode is taken advantage of efficiently. A short transmission timing value such as 1 μsec, however, may cause a failure of a station to receive a signal properly. In this regard, power saving performance is improved by setting a transmission timing between 10 μsec and 50 μsec. In order to let the transmission timing fall within this range, it is preferable that the coordinator set the IFS vector properly by referring to the number of stations.

By taking into consideration a station-unique value, i.e., the station's own ID, in calculating its transmission order value, the transmission timing unique to the station is determined. With this, each station is capable of determining its order of data signal transmission so that transmissions by the stations do not overlap in the sequence. Therefore, in accordance with the communication system 1 of the second example, the likelihood of collision of signals from the stations is eliminated so that stable communication is achieved.

Each of the stations transmit its own status information to the other stations in multicast according to its own transmission timing. The timing chart of FIG. 9 illustrates a situation in which data are multicast from the stations according to the determined transmission timing. A signal representation filled with dots indicates a signal properly received by the station.

In the collision avoidance mode of the second example, the transmission order of the stations may be changed from transmission to transmission. This is achieved by using beacon IDs that are different for different beacon signals in determining the transmission order value. The above example concerns a case where the beacon ID is 4. A consideration will now be given of a case where the transmission order value is determined with reference to the next beacon signal, i.e., the beacon signal with the beacon ID of 5. The transmission order value of station A (station ID=0) is determined as $$(0+5) \bmod 4 = 1$$

That the transmission order value is 1 means the second earliest in the sequence of transmission.

In this case, the transmission order value of station B (station ID=1) is 2, the value of station C (station ID=2) is 3, and the value of station D (station ID=3) is 0. Thus, when the beacon ID is 5, transmission is ordered to occur in the sequence of station D, station A, station B and station C.

Each of the stations determines its transmission timing using the transmission order value thus determined. The transmission timing of station A is determined as $$15 + 1 \times 7 = 22 \ \mu sec.$$

The transmission timing of station B as similarly calculated is 29 μsec, the transmission timing of station C is 36 μsec, and the transmission timing of station D is 15 μsec.

In the communication system 1 over an air interface, the communication environment worsens frequently due to jamming etc. Particularly, under CSMA/CA control according to IEEE802.11, the station stands by for its own transmission in a carrier sensing period. Therefore, jamming may disable signal transmission. Considering signal transmission from the stations in the same group, the likelihood of the station assigned the last order of transmission in the transmission sequence being unable to send a signal is definitely greater than the other stations.

While the status information transmitted from a station may be encrypted, the beacon signal transmitted from the coordinator is not encrypted. Therefore, the beacon signal is delivered to stations of other groups using the same frequency.

It is preferable for coordinators in other groups to analyze the beacon signal and set the signal transmission timings in its group that do not overlap the transmission timings of the group originating the beacon signal. For example, this can be achieved by changing the IFS0 value in the IFS vector value.

We will examine a situation in which two groups sharing the same frequency band build respective networks in the same environment. It will be assumed that IFS0 is set to 15 μsec and IFS offset is set to 7 μsec in the first group. The coordinator in the second group acquires the IFS vector value from a beacon signal from the first group so as to set the IFS vector value in the second group. In this process, the IFS vector value is set so that the transmissions do not overlap those of the stations in the first group. For example, IFS0 is set to 19 μsec and IFS offset is set to 7 μsec. Where there are four stations in each of the groups, the transmission timings of the stations in the first group are 15 μsec, 22 μsec, 29 μsec and 36 μsec. The transmission timings of the stations in the second group are 19 μsec, 26 μsec, 33 μsec and 40 μsec.

Figure 10:
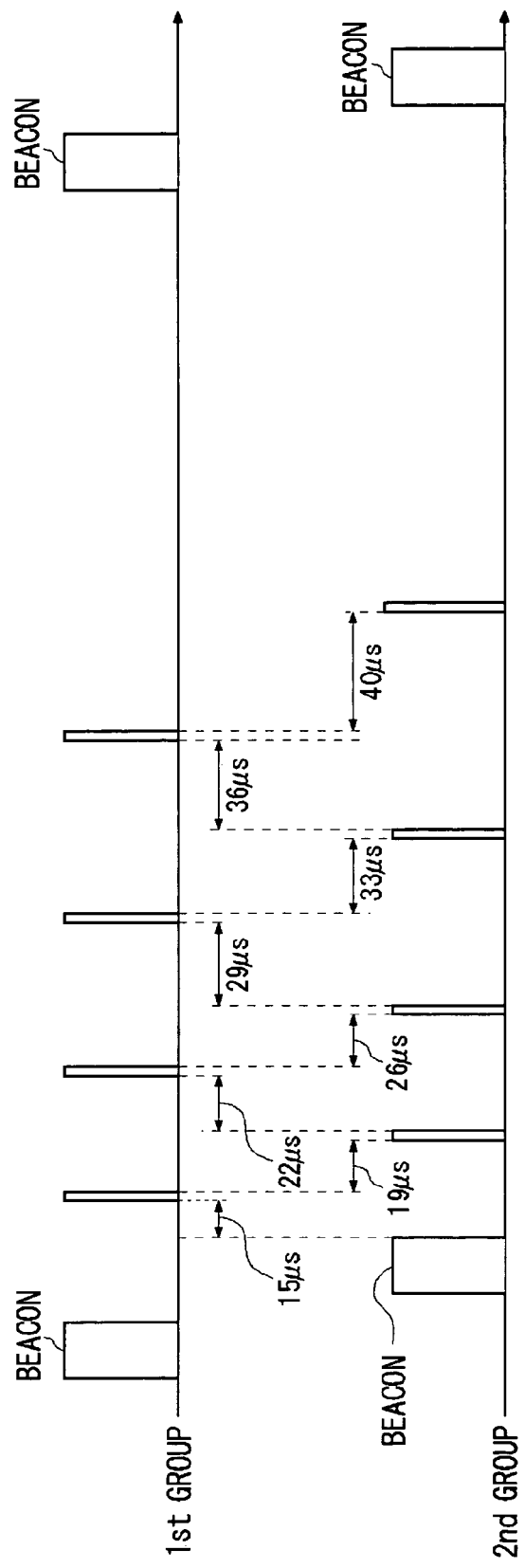
FIG. 10 is a timing chart illustrating the transmitting operation of stations in two groups.

FIG. 10 illustrates the transmission timings of the stations in the two groups. Given that the transmission timings of stations in the first group are set to 15 μsec, 22 μsec, 29 μsec and 36 μsec and the transmission timings of stations in the second group are set to 19 μsec, 26 μsec, 33 μsec and 40 μsec, the stations in the respective groups transmit signals with reference to the transmission time of the other group. In this case, the groups alternately transmit signals. By sharing the common IFS offset and by using different IFS0s in a plurality of groups, inter-group collision of signals is easily avoided.

A description will now be given of the self-controlled power saving mode according to the second example.

Referring back to FIG. 9, a basic approach in the self-controlled power saving mode is that each of the stations enters a power saving state in response to its reception of data signals from all other stations in the same group and its transmission of a data signal to all other stations. In the second example, each station is expected to send game data once in a beacon interval. When the station has completed the reception of data signals from the other stations and transmission of its own data signal, communication expected to be performed in the beacon interval is completed. Each station counts the number of data signals received from other stations and makes a transition to a power saving state by referring to the number of data signals counted and the fact that the station has transmitted its own data signal. By allowing each station to make a transition to a power saving state autonomously, it is not necessary in the communication system 1 for a coordinator or the like to directly apply power control on the other stations.

According to this self-controlled power saving mode, the station can make a transition to a power saving state without delay subsequent to the transmission and reception of necessary signals. As a result, efficiency in power saving is improved. Since a period in which the station remains active needlessly is eliminated and power control is achieved by a simple algorithm, the mode is suitable practical application.

According to power control using this algorithm, when a station fails to receive a signal from another station, the failing station has to continue to wait a signal from other stations during the beacon interval. In this interval, the failing station cannot enter a power saving state. It might be possible to disregard this problem, which is deemed to be not so serious considering the frequency of such situations, the occupancy thereof in the entirety of time available for communication being so small as to be almost negligible. If, however, such situations is addressed by a simple structure, such a structure should preferably be introduced to enhance the efficiency in power saving.

Figure 11:
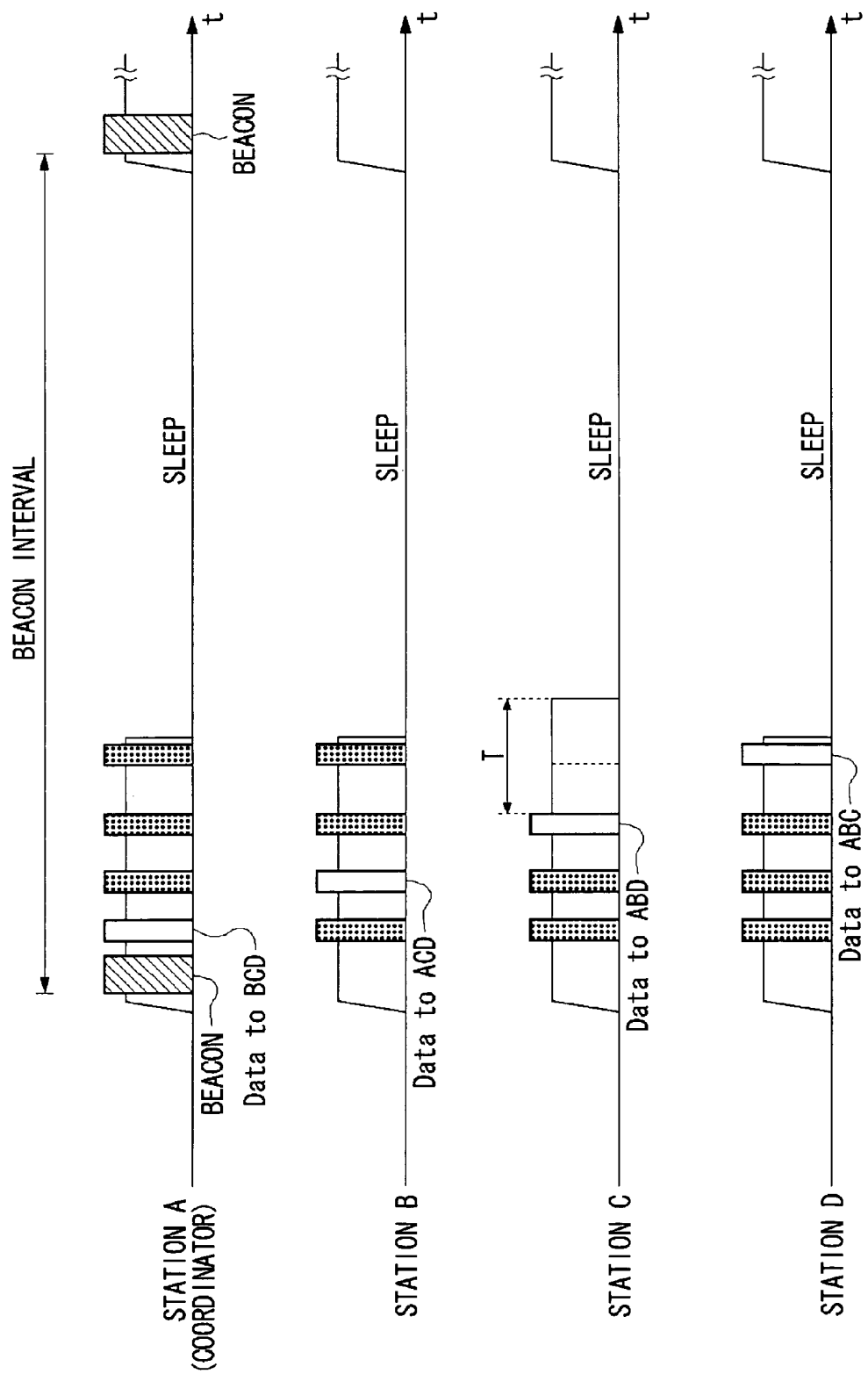
FIG. 11 is a timing chart illustrating the operation of stations for achieving a self-controlled power saving mode and a collision avoidance mode.

FIG. 11 is a timing chart illustrating the operation in stations for achieving the self-controlled power saving mode and the collision avoidance mode. FIG. 11 illustrates a case where station C fails to receive a data signal transmitted in multicast from station D. Each of stations A, B and D makes a transition to a power saving state following its reception of the signal from station D or following the transmission of its own signal, ensuring that it has received signals from all other stations and has transmitted its own signal.

Each of the station is provided with the function of monitoring the communication state. In the example of FIG. 11, station C, as well as the other stations, monitors the communication state and measures a non-communication period. The phrase "non-communication period" refers to a period of time in which a signal transmission/reception to and from other stations does not occur. The station may determine whether or not the received signal is derived from the other station constituting the same group by referring to BSSID contained in the signal. Each station has the information of the maximum interval between transmission times that could occur within the group, by referring to the number of stations and the IFS vector value. For example, given that the number of stations is 4, IFS0 is 15 μsec, and IFS offset is 7 μsec, the maximum interval between transmission times is 36 μsec. Accordingly, when a signal cannot be observed in a station beyond the 36 μsec period, the maximum interval between transmission times, since the reception of a signal from another station or the transmission from within the station, it is likely that signals cannot be received even if the station continues to wait. Therefore, each station makes a transition to a power saving state when the non-communication period exceeds the predetermined time T.

In the example of FIG. 11, station C fails to receive the signal from station D and makes a transition to a power saving state after waiting a predetermined time T. The predetermined time T is set to be longer than the longest interval among the intervals between transmission times that the stations constituting the group determine. That is, the predetermined time T is set to the maximum interval between transmission times plus a certain margin. For example, given that the maximum interval between transmission times is 36 μsec, the predetermined time T may be set to 40 μsec.

The functional block diagram of the station, i.e., the game device 2 of the second example is the same as described in the first example with reference to FIG. 6. The communication function in the second example is also implemented in the communication processor 4 by a CPU, a memory and a program loaded into the memory.

When the game device 2 functions as a coordinator, the MAC unit 20 includes communication parameters in a data frame transmitted in unicast to each of the game devices 2 in the same group. With this, all game devices 2 in the same group can share the communication parameters. When all game devices 2 enter a game mode, the game device 2 as a coordinator transmits a beacon signal that includes the beacon ID, the number of IBSS stations, the IFS vector value, which are data elements for use in determining the transmission timing. The timing for generating a beacon signal in the MAC unit 20 and the timing for transmitting a beacon signal by the PHY unit 26 are controlled by the power/clock controller 24.

Figure 12:
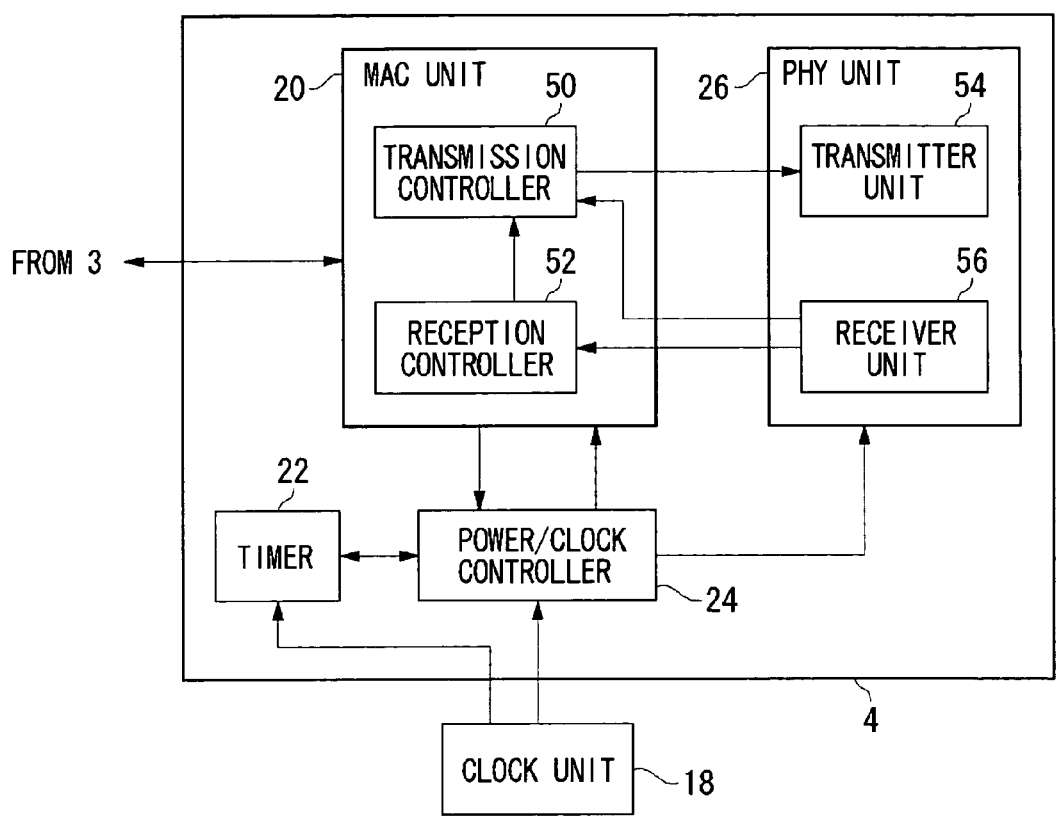
FIG. 12 illustrates the details of a communication processor illustrated in FIG. 6.

FIG. 12 illustrates the details of the communication processor illustrated in FIG. 6. The illustration focuses on the communication function for achieving the self-controlled power saving mode and the collision avoidance mode according to the second example. In the communication processor 4, the MAC unit 20 is provided with a transmission controller 50 and a reception controller 52, and the PHY unit 26 is provided with a transmitter unit 54 and a receiver unit 56. The transmitter unit 54 in the PHY unit 26 transmits a data signal to other game devices 2. The receiver unit 56 receives a data signal from other game devices 2. In the MAC unit 20, the transmission controller 50 controls the transmitting operation in the transmitter unit 54 and the reception controller 52 controls the receiving operation in the receiver unit 56.

In the game device 2 functioning as a coordinator, the transmission controller 50 generates a beacon signal including a beacon ID, the number of IBSS stations and the IFS vector values. The requirement for beacon ID is that different IDs are used for beacon signals in succession. The IDs may be reused at a predetermined cycle. Actually, the number of bits available to represent a beacon ID is limited, and so the beacon IDs are periodically repeated. More specifically, the transmission controller 50 represents the beacon ID by four-bit data and assigns numerals 0 through 15 to the beacon ID cyclically. Therefore, the beacon IDs have different values for different beacon signals. The number of IBSS stations is the number of stations constituting the group. Furthermore, the IFS vector values include data, IFS0 defining a reference time for transmission and IFS offset defining an offset from the reference time, IFS0. In the game device 2 functioning as the coordinator, the transmitter unit 54 transmits the beacon signal generated in the transmission controller 54 periodically.

In the collision avoidance mode, the receiver unit 56 receives a beacon signal including data elements for use in determining the transmission timing in the game device 2 other than one functioning as the coordinator. The beacon signal is forwarded to the transmission controller 50. The beacon signal includes the beacon ID. The transmission controller 50 determines the transmission timing for transmission from within the device, by referring to the data elements included in the beacon signal.

The transmission controller 50 refers to the beacon ID to determine, for each transmission, the transmission order within the group. According to this approach, the transmission controller 50 is capable of changing the transmission order with each event of transmission so as to avoid a situation in which the transmission state in specific game devices 2. The game devices 2 assigned the order relatively later in the transmission sequence may have less chance of completing the transmission. By making the transmission order variable, fairness in assigning the priority in transmission from the game devices 2 is ensured.

In addition to referring to the beacon ID, the transmission controller 50 determines the data signal transmission timing by using the station ID assigned to the game device 2. The station IDs assigned differ from game device to game device. By allowing the game devices 2 to share the same equation for determining the transmission timing and use the station ID as a parameter for computation, the determination of the transmission timing unique to each game device is made possible. With this, it is ensured that each game device 2 determines its data signal transmission timing such that it does not overlap the data signal transmission timings of the other game devices 2 constituting the group. By eliminating the chances of simultaneous transmission, smooth communication is achieved.

As described above, the game devices 2 other than the coordinator may determine the transmission timing by receiving the beacon signal. On the contrary, in the game device 2 functioning as the coordinator, the transmission controller 54 has the data elements which are included in the beacon signal. Thus, the transmission controller 54 can determine the transmission timing for transmission of its own data signal based on the data elements held in itself, as described above.

The transmission controller 50 may determine the transmission timing in a variety of manners. In one alternative approach, the transmission controller 50 may set a transmission timing as an elapsed time since the detection of signal from another terminal, and the transmitter unit 54 may transmit a data signal when the specified time determined as the transmission timing, has elapsed.

In the self-controlled power saving mode, the receiver unit 56 receives data signals from other game devices 2. The reception controller 52 counts, in each beacon interval, the number of data signals received by the receiver unit 56 from other game devices 2. The beacon signal includes the number of stations. The reception controller 52 is capable of knowing the number of game devices 2 by referring to the number of stations. For example, if the number of stations is 4, it is found that three game devices 2 coexist other than itself.

For example, the reception controller 52 may identify the game device 2 by referring to the station ID included in the data signal received from another game device 2. The station IDs of the game devices 2 constituting the group are known. For example, when the number of stations is four and the game device's own station ID is 1, the station IDs of the other three game devices 2 are 0, 2 and 3, respectively. As the receiver unit 56 receives data signals from other game devices 2 each assigned the station ID of 0, 2 or 3, the reception controller 52 counts the number of data signals. Described here is an example where the reception controller 52 identifies other game devices 2 by referring to their station IDs. Alternatively, the game devices 2 may be identified by referring to their MAC addresses. The reception controller 52 may list the station IDs or MAC addresses of the other game devices 2 in a table and refer to the table to determine whether a particular data signal from another game device 2 should be counted.

Upon receipt of the data signals from all other game devices 2, the reception controller 52 notifies the power/clock controller 24 accordingly. Responsive to the notification, the power/clock controller 24 shifts itself to a power saving state.

More specifically, the reception controller 52 issues a command to the power/clock controller 24 for transition to a sleep state. The power/clock controller 24 prevents power consumption in the MAC unit 20 and the PHY unit 26 by suspending the supply of a clock to the MAC unit 20 and the PHY unit 26 to suspend their operation. With this, the MAC unit 20 and the PHY unit 26 enter a sleep state. Concurrently, the power/clock controller 24 sets the timer 22 so that the MAC unit 20 and the PHY unit 26 return to an active state after an elapse of predetermined period of time since their entry into the sleep state. The timer control is executed on the basis of the TBTT value. The timer 22 counts the pulses supplied from the clock unit 18 and supplies a wake signal to the power/clock controller 24 after the predetermined period of time elapses. Upon receipt of the wake signal, the power/clock controller 24 causes the MAC unit 20 and the PHY unit 26 to make a transition to an active state.

The reception controller 52 monitors the communication state. When the non-communication period exceeds a predetermined period of time, the reception controller 52 notifies the power/clock controller 24 accordingly. The predetermined time is set to be the longest of the time interval between the transmission times determined by the devices 2. Responsive to the notification, the power/clock controller 24 enters a power saving state. More specifically, the reception controller 52 issues a command to the power/clock controller 24 for transition to a power saving state. The power/clock controller 24 prevents power consumption in the MAC unit 20 and the PHY unit 26 by suspending the supply of a clock to the MAC unit 20 and the PHY unit 26 to suspend their operation.

Figure 13:
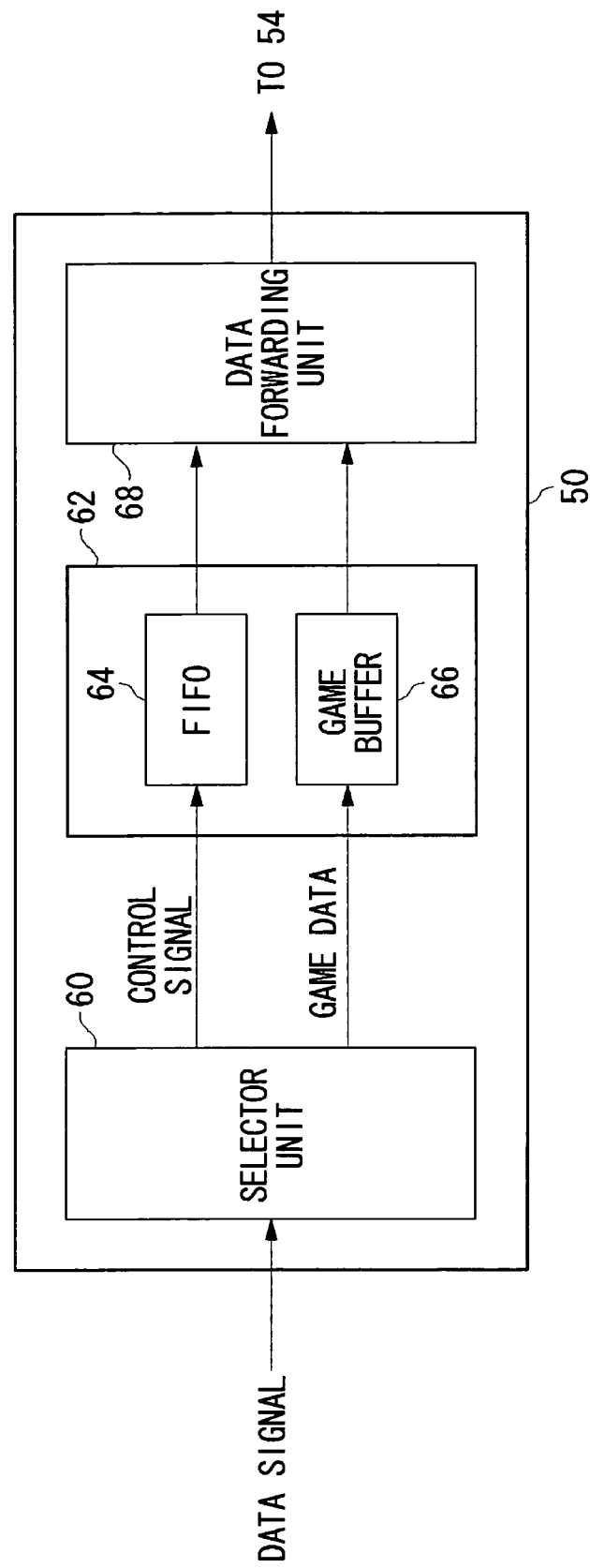
FIG. 13 illustrates the structure of a transmission controller.

FIG. 13 illustrates the structure of the transmission controller 50. The transmission controller 50 is provided with a selector unit 60 and a data forwarding unit 68. The selector unit 60 divides data signals for transmission into two categories. More specifically, selection is made between game data and other signals. The phrase "other signals" encompasses a control signal such as a set of basic parameters to conduct communication. In the following description, signals other than game data are generically referred to as a control signal.

The control signal and game data are supplied to a FIFO 64 and a game buffer 66, respectively, that are provided in a storage unit 62. The FIFO 64 is a first-in first out memory that sequentially stores the control signal supplied from the selector unit 60 and outputs the same in the order of storage. The transmission of a control signal generally does not require real-time processing. By appropriately timing the output of the control signal from the FIFO 64, intended purposes of the control signal are served.

The game buffer 66 is configured as an overwrite memory. In a game application requiring low delay, it is important to send one data block after another on a real-time basis. When new data is generated in the even of a transmission delay, delayed data need not be transmitted. By configuring the game buffer as an overwrite memory, enabling new data to overwrite old data, real-time availability of data is ensured.

The data stored in the FIFO 64 and the game buffer 66 are sent to the data forwarding unit 68. The data forwarding unit 68 forwards the data sent from the FIFO 64 and the game buffer 66 to the transmitter unit 54. It is preferable that the data sent from the FIFO 64 be given the priority in being forwarded to the transmitter unit 54, subject to the condition that the transmission of game data does not suffer a failure. One such condition that inhibits prioritized forwarding may be initiated when the data size of the control signal from the FIFO 64 is so large as to prevent proper transmission of game data absent any counter measures. In this case, the data forwarding unit 68 may divide the control signal into small segments before forwarding them to the transmitter unit 54. Prioritized forwarding of data from the FIFO 64 is conducted in the background that, in the self-controlled power saving mode, transition to a power saving state is triggered by the transmission or reception of game data. By transmitting a control signal in preference to game data, the transmitter unit 54 is capable of transmitting the control signal properly in the self-controlled power saving mode.

Figure 14:
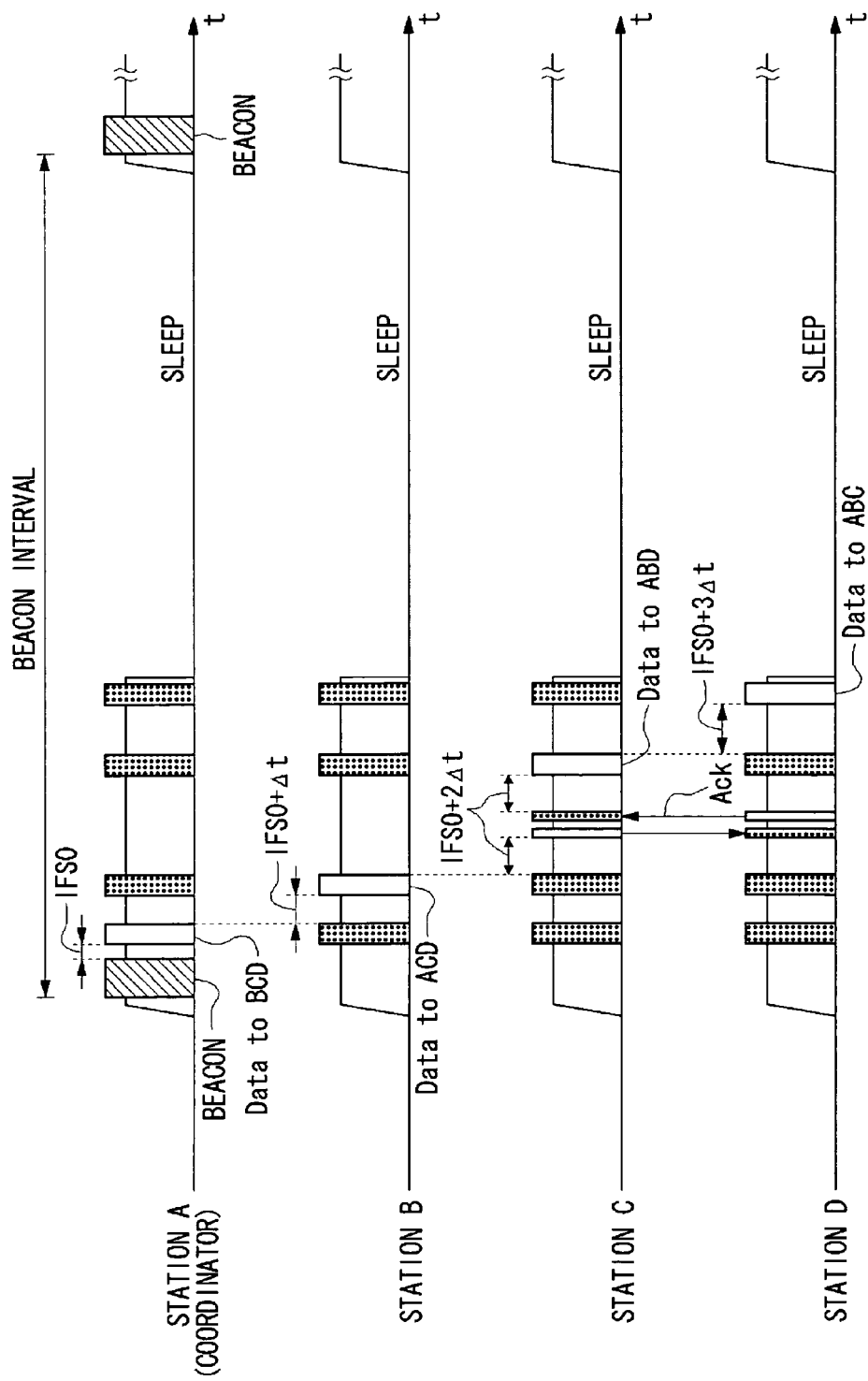
FIG. 14 is a timing chart illustrating the transmission of a control signal.

FIG. 14 is a timing chart illustrating the transmission of a control signal. In the example of FIG. 14, station C transmits a control signal to station D in unicast before transmitting game data in multicast. In response to ACK from station D, station C sends game data in multicast. The transmission timing determined in the collision avoidance mode is observed not only in the transmission of game data but also in the transmission of a control signal.

In the second example, a description was given of the concomitant use of the collision avoidance mode and the self-controlled power saving mode. As mentioned before, by using these modes together, efficient communication and power control are achieved. It is to be noted, however, that these modes may be executed independently.

In the second example, a description was given of a case where a data signal (game data) is transmitted in multicast. Alternatively, a data signal may be transmitted in broadcast. Broadcast transmission also helps shorten the period of time for transmission since it requires only one operation for transmission to the other stations. Also, the collision avoidance mode and the self-controlled power saving mode can be achieved not only in an ad hoc mode of IEEE802.11 as described, but also in an infrastructure mode.

Described above is an explanation based on the examples. The examples are only illustrative in nature and it will be obvious to those skilled in the art that variations in constituting elements and processes are possible within the scope of the present invention. In describing the examples above, our assumption is that low delay is required and type 3 multicast communication is conducted. It will be appreciated that the present invention is also useful for a system in which the type 1 or type 2 communication is employed, as well as being useful for power saving control in the case of low delay requirement.

It will also be possible to build the communication system 1 such that the power saving mode of first example and the power saving mode of the second example are used concomitantly. More specifically, the communication system 1 may be provided with: a first power saving mode in which a plurality of communication terminals enter a sleep state when one of the plurality of communication terminals transmits a broadcast signal; and a second power saving mode in which a communication terminal enters a sleep state autonomously by learning that the number of data signals received from other communication terminals has reached a predetermined value, wherein the power saving modes are selectively executed. The strength of the second power saving mode, i.e., the self-controlled power saving mode, particularly lies in power control in communication requiring low delay. Accordingly, by enforcing the second power saving mode for a game application with relatively severe requirement for real-time processing and by enforcing the first power saving mode for a game application not requiring as severe requirement, the communication system 1 achieving highly efficient power saving is provided. The level of requirement for real-time processing may be determined according to the title or genre of a game. For example, the application processing unit 12 may determine the requirement for real-time processing on the basis of the title or genre acquired and may inform the MAC unit 20 of the requirement. The MAC unit 20 may autonomously select the power saving mode described in the first example or the mode described in the second example.

The second example as described concerns a self-controlled power saving mode in which a station enters a power saving state basically on the condition that the station has completed the reception of data signals from the other stations in the same group and also completed the transmission of the station's own data signal. In the described example, each station enters a power saving state on the condition that one data signal is received from each of the other stations. Alternatively, the condition may be that a predetermined number of data signals has been received from each of the other stations. The predetermined number may be, for example, three. In this case, the power saving state may be entered on the condition that three data signals have been received from each of the other stations and that the station itself has completed the transmission of one data signal.

According to another alternative, each station may enter a power saving state in accordance with either the number of transmissions of data signals or the number of received data signals counted. The roles played by the stations in a group may differ from station to station. In this case, the station dedicated to reception may enter a power saving state in accordance with the number of received data signals counted. The station dedicated to transmission may enter a power saving state upon learning that the number transmissions of data signals has reached a predetermined value.

What is claimed is:

1. A communication terminal which constitutes a group with at least one other communication terminal and communicates within the group, each of the communication terminals including a respective unit ID, comprising:
   a receiver unit which receives a broadcast signal including a broadcast signal ID for determining a transmission timing;
   a transmission controller which refers to the broadcast signal ID to determine, for each transmission, the transmission timing for transmission of a data signal by calculation of a numerical operation using at least the broadcast signal ID included in the broadcast signal and a unit ID assigned to the communication terminal so that the determined transmission timing does not overlap with the transmission timing of the at least one other communication terminal within the group,
   wherein different broadcast signal IDs are included in different broadcast signals transmitted in succession, and all the unit IDs assigned to the communication terminals forming the group are unique; and
   a transmitter unit which transmits the data signal to the at least one other communication terminal according to the transmission timing determined by the transmission controller
   wherein an order of transmission of the communication terminals is changed from transmission to transmission.

2. The communication terminal according to claim 1, wherein the transmission controller sets the order of transmission of the data signal within the group, by referring to the broadcast signal ID included in the broadcast signal.

3. The communication terminal according to claim 1, wherein the transmission controller sets the transmission timing as an elapsed time since the detection of a signal from the other communication terminal, and wherein the transmitter unit transmits the data signal when the time set as the transmission timing elapses since the detection of a signal from the other communication terminal.

4. The communication terminal according to claim 1, wherein the unit IDs of the communication terminals are rotated so that a particular communication terminal does not always transmit last in the order of transmission.

5. The communication terminal according to claim 1, wherein a second group of communication terminals utilizes the transmission timing of the group to set a transmission timing of the second group to avoid collisions between the group and the second group of communication terminals.

6. A communication method adapted for a communication terminal which constitutes a group with one or more other communication terminals and communicates within the group, each of the communication terminals including a respective unit ID, comprising the steps of:
   receiving a broadcast signal including a broadcast signal ID for determining a transmission timing for transmission of a data signal;
   determining, by referring to the broadcast signal ID, the transmission timing for transmission of the data signal by calculation of a numerical operation using at least the broadcast signal ID included in the broadcast signal and a unit ID assigned to the communication terminal so that the determined transmission timing does not overlap with the transmission timing of the other communication terminals within the group, wherein different broadcast signal IDs are included in different broadcast signals transmitted in succession, and all the unit IDs assigned to the communication terminals forming the group are unique; and
   transmitting the data signal to one or more other communication terminals according to the determined transmission timing,
   wherein an order of transmission of the communication terminals is changed from transmission to transmission.

7. A non-transitory computer-readable storage medium having a program stored therein which causes a computer in a communication terminal which constitutes a group with one or more other communication terminals and communicates within the group, each of the communication terminals including a respective unit ID, to carry out the functions of:

receiving a broadcast signal including a broadcast signal ID for determining a transmission timing for transmission of a data signal;

determining, by referring to the broadcast signal ID, the transmission timing for each transmission of the data signal by calculation of a numerical operation using at least the broadcast signal ID included in the broadcast signal and a unit ID assigned to the communication terminal so that the determined transmission timing does not overlap with the transmission timing of the other communication terminals within the group, wherein different broadcast signal IDs are included in different broadcast signals transmitted in succession, and all the unit IDs assigned to the communication terminals forming the group are unique; and transmitting the data signal to one or more other communication terminals according to the determined transmission timing, wherein an order of transmission of the communication terminals is changed from transmission to transmission.

8. A communication system for communication between a plurality of communication terminals constituting a group, each of which includes a respective unit ID, and further including:

a receiver unit which receives a broadcast signal including a broadcast signal ID for determining a transmission timing;

a transmission controller which refers to the broadcast signal ID to determine, for each transmission, the transmission timing for transmission of a data signal by calculation of a numerical operation using at least the broadcast signal ID included in the broadcast signal and a unit ID assigned to the communication terminal so that the determined transmission timing does not overlap with the transmission timing of the other communication terminals within the group, wherein different broadcast signal IDs are included in different broadcast signals transmitted in succession, and all the unit IDs assigned to the communication terminals forming the group are unique; and a transmitter unit which transmits the data signal to the at least one other communication terminal according to the transmission timing determined by the transmission controller, wherein an order of transmission of the plurality of communication terminals is changed from transmission to transmission.

* * * * *